US012645342B2

(12) United States Patent　(10) Patent No.:　US 12,645,342 B2
Iordan et al.　(45) Date of Patent:　　Jun. 2, 2026

(54) SOFTWARE DEVELOPMENT (DEVOPS) PIPELINES FOR ROBOTIC PROCESS AUTOMATION

(71) Applicant: UiPath Inc., New York, NY (US)

(72) Inventors: Alexandru Iordan, Buchare (RO); Alexandru Ghimisi, Buchare (RO); Mircea Grigore, Buchare (RO); Florin Radu Tapus, Buchare (RO); Satiswar Dash, Bangalore (IN); Silviu Georgescu, Buchare (RO)

(73) Assignee: UiPath Inc., New York, NY (US)

( * ) Notice: Subject to any disclaimer, the term of this patent is extended or adjusted under 35 U.S.C. 154(b) by 551 days.

(21) Appl. No.: 18/190,499

(22) Filed: Mar. 27, 2023

(65) Prior Publication Data

US 2024/0210903 A1　　Jun. 27, 2024

(51) Int. Cl.
*G06F 3/0482*　　(2013.01)
*G06F 3/04817*　　(2022.01)
*G06F 8/34*　　(2018.01)
*G06Q 10/10*　　(2023.01)

(52) U.S. Cl.
CPC ............. *G06F 3/0482* (2013.01); *G06F 8/34* (2013.01); *G06F 3/04817* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 10,528,332 B2 | 1/2020 | Atkinson | |
| 11,200,539 B2 * | 12/2021 | Iyer ................... | G06Q 10/0633 |
| 11,232,198 B2 | 1/2022 | Hecht | |

(Continued)

FOREIGN PATENT DOCUMENTS

| | | |
|---|---|---|
| CN | 114770529 A | 7/2022 |
| CN | 115129427 A | 9/2022 |

OTHER PUBLICATIONS

Tripathi, A. M. (2018). Learning Robotic Process Automation: Create Software Robots and Automate Business Processes with the Leading RPA Tool—UiPath. Germany: Packt Publishing. (Year: 2018).*

*Primary Examiner* — Linda Huynh
(74) *Attorney, Agent, or Firm* — Law Office of Andrei D Popovici, PC

(57) ABSTRACT

In some embodiments, an RPA design interface exposes a set of DevOps activities for creating a DevOps pipeline. Exemplary DevOps activities include activities for pulling a target RPA workflow from a code repository, testing, building, and deploying the respective RPA workflow to a client's production environment. The pipeline may then be executed by conventional RPA robots, as any other RPA workflow. Endowing an RPA design tool with DevOps functionality substantially facilitates RPA development by enabling RPA developers to carry out DevOps without requiring specialized knowledge of DevOps software. Some embodiments further enable RPA developers to create complex DevOps pipelines combining DevOps activities with other robotic activities, such as interacting with GUIs, spreadsheets, and electronic communication applications, among others.

19 Claims, 10 Drawing Sheets

(56)     References Cited

U.S. PATENT DOCUMENTS

| | | | | |
|---|---|---|---|---|
| 11,435,871 B1* | 9/2022 | Luvaas | ............... | G06F 3/04817 |
| 11,449,366 B2 | 9/2022 | Patel | | |
| 2007/0180424 A1* | 8/2007 | Kazakov | ................... | G06F 8/10 |
| | | | | 717/104 |
| 2016/0188769 A1* | 6/2016 | Aylott | .................... | G06F 30/20 |
| | | | | 703/6 |
| 2020/0371903 A1* | 11/2020 | Straub | ................. | G06F 11/3676 |
| 2020/0384644 A1* | 12/2020 | Chae | ......................... | G06F 8/36 |
| 2020/0387358 A1* | 12/2020 | Chae | ................... | G06F 9/44589 |
| 2021/0109717 A1* | 4/2021 | Voicu | ..................... | G06F 9/451 |
| 2021/0109722 A1* | 4/2021 | Ripa | ........................ | G06F 8/34 |
| 2021/0191843 A1* | 6/2021 | Stocker | .............. | G06F 11/3698 |
| 2021/0279050 A1 | 9/2021 | Chen | | |
| 2021/0326244 A1* | 10/2021 | Stocker | .............. | G06F 11/3688 |
| 2021/0347062 A1* | 11/2021 | Dinica | ..................... | G06F 8/36 |
| 2022/0121480 A1 | 4/2022 | Chivukula | | |
| 2022/0129301 A1 | 4/2022 | Adeyunowo | | |
| 2022/0237154 A1 | 7/2022 | Pal | | |
| 2023/0305813 A1* | 9/2023 | Jalal | ......................... | G06F 8/10 |

* cited by examiner

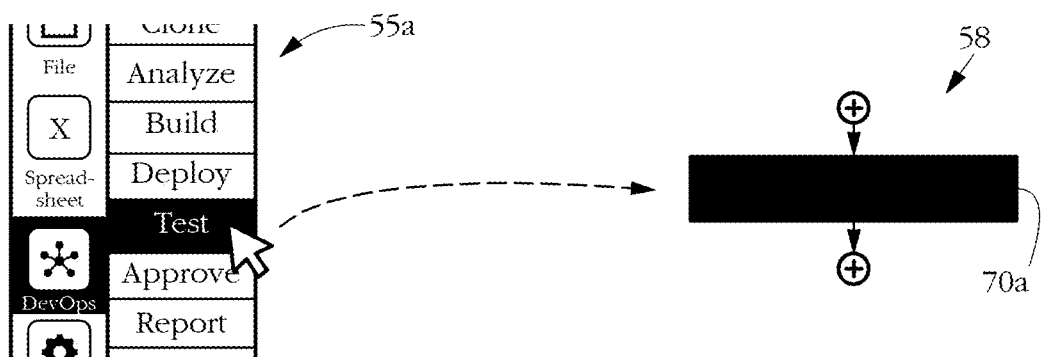
FIG. 6-A
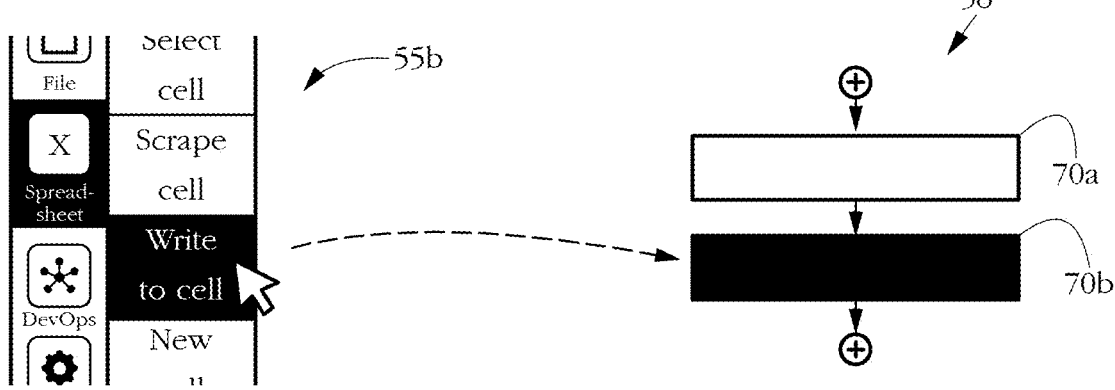
FIG. 6-B
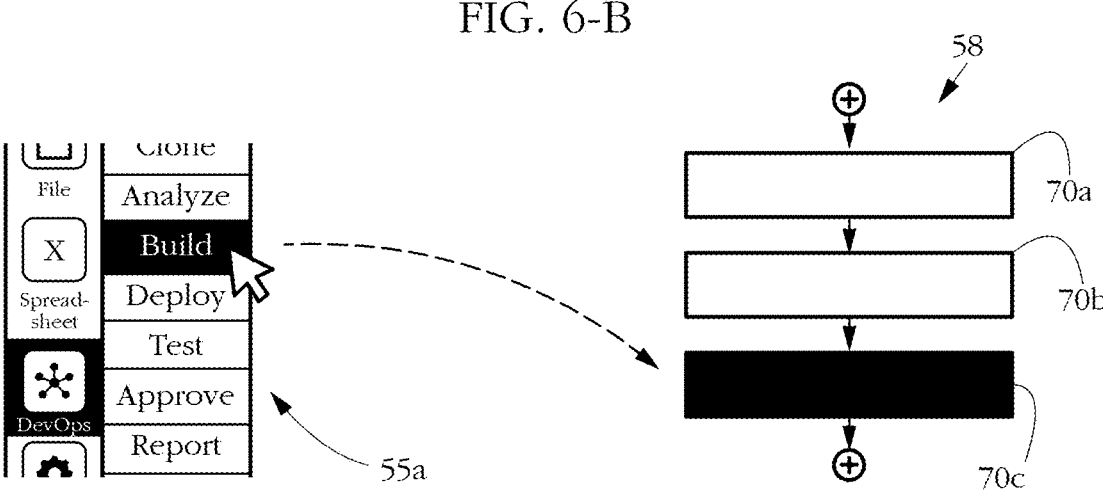
FIG. 6-C

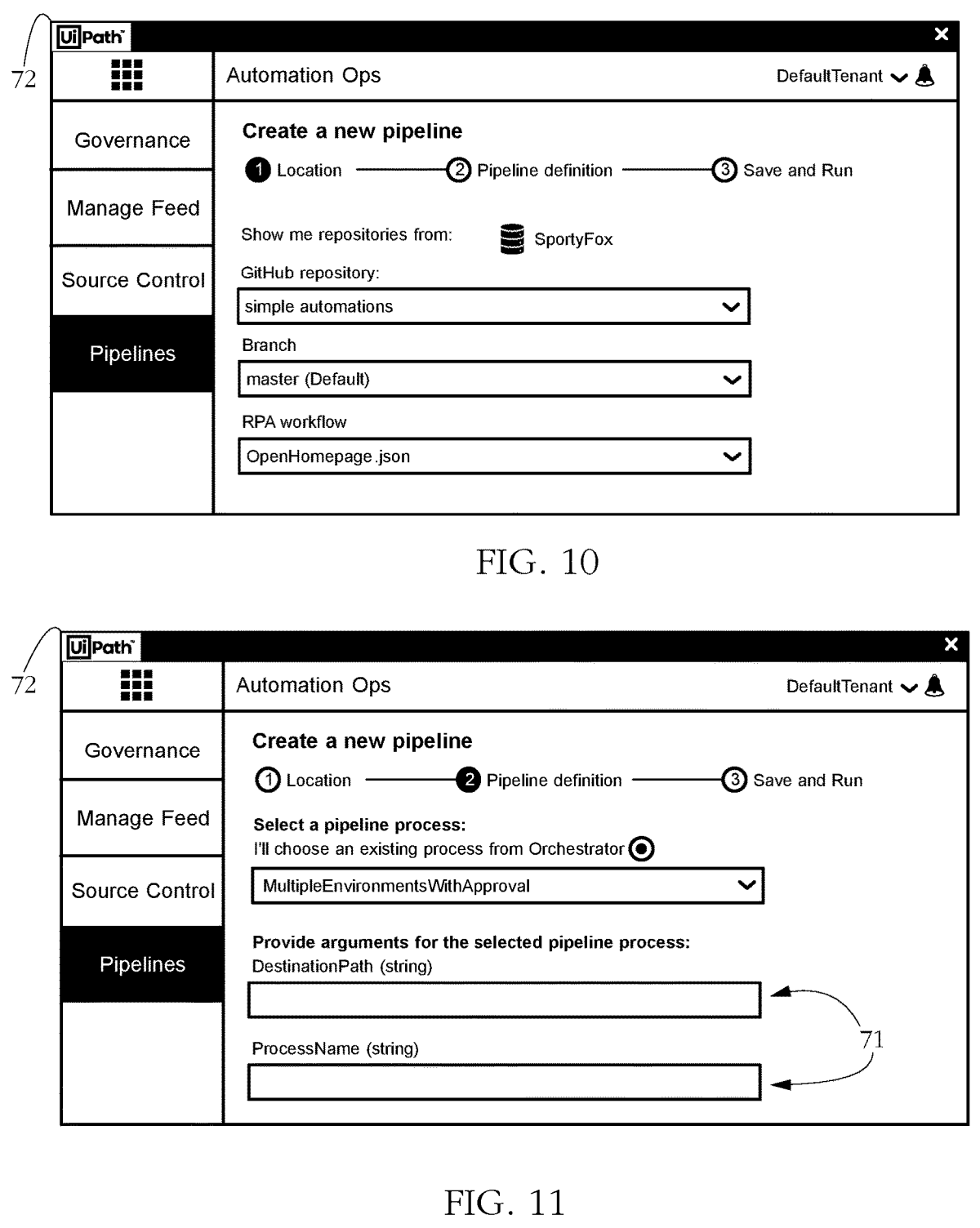

72

UiPath

Automation Ops                                    DefaultTenant ∨ 🔔

Governance

Manage Feed

Source Control

Pipelines

Create a new pipeline

① Location ———————② Pipeline definition ———————③ Save and Run

Show me repositories from:      🗄 SportyFox

GitHub repository:
| simple automations                                                      ∨ |

Branch
| master (Default)                                                        ∨ |

RPA workflow
| OpenHomepage .json                                                      ∨ |

UiPath

Automation Ops                                    DefaultTenant ∨ 🔔

Governance

Manage Feed

Source Control

Pipelines

Create a new pipeline

① Location ———————② Pipeline definition ———————③ Save and Run

Select a pipeline process:
I'll choose an existing process from Orchestrator ◉

| MultipleEnvironmentsWithApproval                                        ∨ |

Provide arguments for the selected pipeline process:
DestinationPath (string)
| | ↰

71

ProcessName (string)
| | ↰

FIG. 11

SOFTWARE DEVELOPMENT (DEVOPS) PIPELINES FOR ROBOTIC PROCESS AUTOMATION

BACKGROUND

The invention relates to robotic process automation (RPA), and in particular to facilitating software development operations (DevOps) for RPA.

RPA is an emerging field of information technology aimed at improving productivity by automating repetitive computing tasks, thus freeing human operators to perform more intellectually sophisticated and/or creative activities. Notable tasks targeted for automation include extracting structured data from documents and interacting with user interfaces, for instance filling forms, among others.

As RPA technology advances and automations become more complex, setting up RPA projects often involves entire teams, wherein multiple developers collaborate to design, test, debug, configure, and deploy RPA solutions to clients. Such software development activities are commonly gathered under the umbrella term 'DevOps'. Teams may employ dedicated software to speed up and integrate DevOps activities. However, tailoring such off-the-shelf DevOps software to the specific needs of each team and project may require highly skilled, specialized knowledge, and may add to the overall costs of software development.

A distinct prong of RPA development is directed at simplifying the programming and management of software robots and automations, with the ultimate goal of extending the reach of RPA technology to 'citizen developers', i.e., users that lack advanced programming skills or specialized training. There is therefore a strong interest in making all aspects of RPA (DevOps included) more user friendly and intuitive, to attract a broad audience of developers and users.

SUMMARY

According to one aspect, a computer system comprises at least one hardware processor configured to execute a robotic process automation (RPA) design application configured to expose a first activity menu including RPA activities for constructing a target RPA workflow and a second activity menu including software development operations (DevOps) activities. The RPA design application is further configured, in response to a user input selecting an RPA activity from the first activity menu and a DevOps activity from the second activity menu, to output a computer-readable specification of a pipeline workflow for carrying out software development operations on the target RPA workflow, the pipeline workflow including the RPA activity and the DevOps activity.

According to another aspect, a method comprises employing at least one hardware processor of a computer system to execute an RPA design application configured to expose a first activity menu including RPA activities for constructing a target RPA workflow and a second activity menu including DevOps activities. The RPA design application is further configured, in response to a user input selecting an RPA activity from the first activity menu and a DevOps activity from the second activity menu, to output a computer-readable specification of a pipeline workflow for carrying out software development operations on the target RPA workflow, the pipeline workflow including the RPA activity and the DevOps activity.

According to another aspect, a non-transitory computer-readable medium stores instructions which, when executed by at least one hardware processor of a computer system, cause the computer system to form an RPA design application configured to expose a first activity menu including RPA activities for constructing a target RPA workflow and a second activity menu including DevOps activities. The RPA design application is further configured, in response to a user input selecting an RPA activity from the first activity menu and a DevOps activity from the second activity menu, to output a computer-readable specification of a pipeline workflow for carrying out software development operations on the target RPA workflow, the pipeline workflow including the RPA activity and the DevOps activity.

BRIEF DESCRIPTION OF THE DRAWINGS

The foregoing aspects and advantages of the present invention will become better understood upon reading the following detailed description and upon reference to the drawings where:

FIGS. 6-A illustrates an exemplary step of designing a DevOps pipeline workflow according to some embodiments of the present invention.

FIGS. 6-B shows another exemplary step of designing the DevOps pipeline workflow according to some embodiments of the present invention.

FIGS. 6-C shows yet another exemplary step of designing the DevOps pipeline workflow according to some embodiments of the present invention.

FIG. 10 shows another exemplary view exposed by the DevOps management interface according to some embodiments of the present invention.

FIG. 11 shows yet another exemplary view exposed by the DevOps management interface according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g., data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
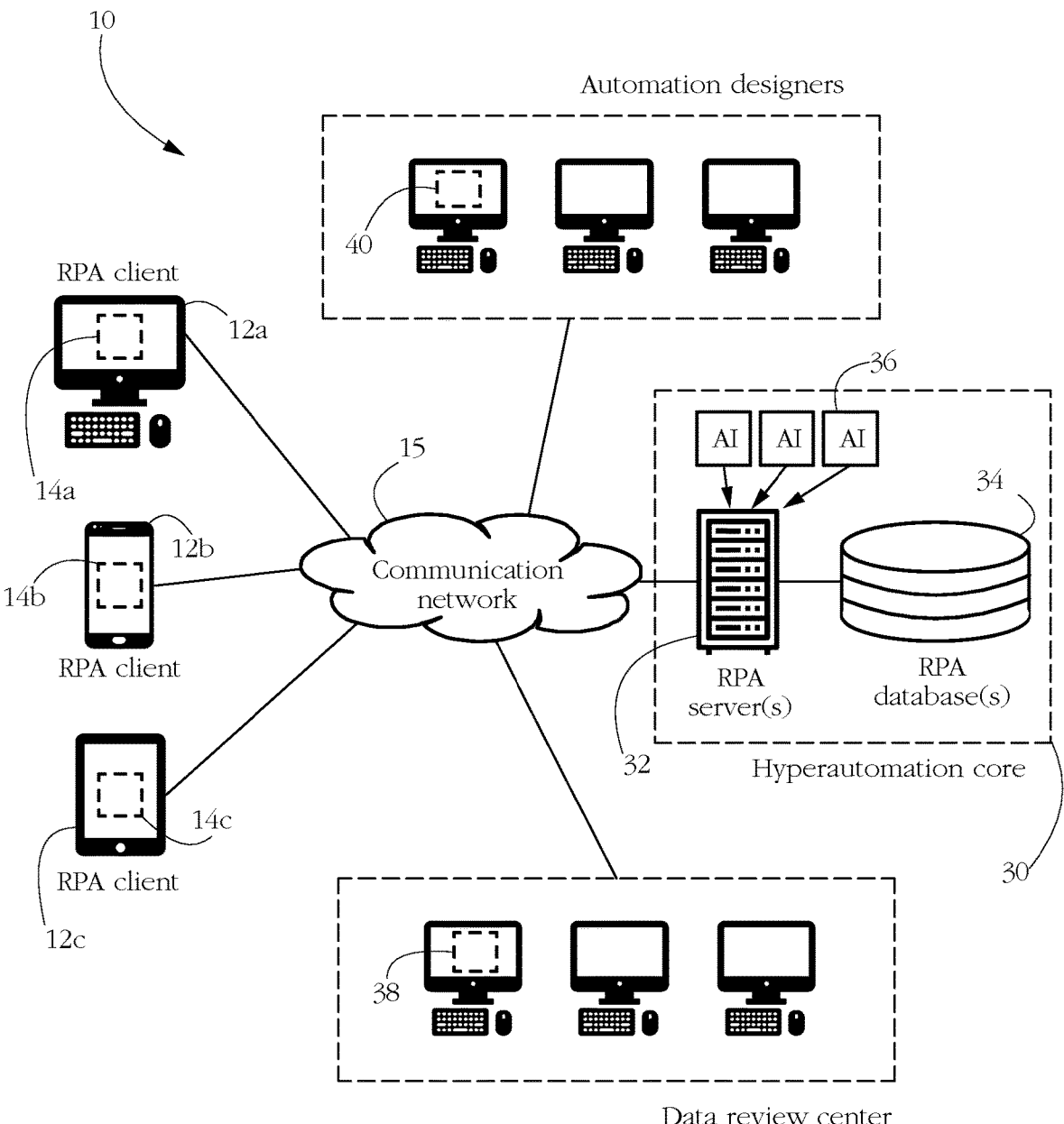
FIG. 1 shows an architectural diagram of a hyper-automation system according to some embodiments of the present invention.

FIG. 1 is an architectural diagram illustrating a hyper-automation system 10 according to some embodiments of the present invention. 'Hyper-automation' as used herein refers to automation systems that bring together components of robotic process automation, integration tools, and technologies that amplify the ability to automate work. In an exemplary robotic process automation scenario, an employee of a company uses a business application (e.g., word processor, spreadsheet editor, browser, email application) to perform a repetitive task, for instance to issue invoices to various clients. To carry out the respective task, the employee performs a sequence of operations/actions, which is herein deemed a work process. Exemplary operations forming a part of an invoice-issuing work process may include opening a Microsoft Excel® spreadsheet, looking up company details of a client, copying the respective details into an invoice template, filling out invoice fields indicating the purchased items, switching over to an email application, composing an email message to the respective client, attaching the newly created invoice to the respective email message, and clicking a 'Send' button. Various elements of system 10 may collaborate to automate the respective work process by mimicking the set of operations performed by the respective human operator in the course of carrying out the respective task. Mimicking a human operation/action is herein understood to encompass reproducing the sequence of computing events that occur when a human operator performs the respective operation/action on the computer, as well as reproducing a result of the human operator's performing the respective operation on the computer. For instance, mimicking an action of clicking a button of a graphical user interface may comprise having the operating system move the mouse pointer to the respective button and generating a mouse click event, or may alternatively comprise toggling the respective GUI button itself to a clicked state.

Exemplary processes targeted for RPA include processing of payments, invoicing, communicating with business clients (e.g., distribution of newsletters and/or product offerings), internal communication (e.g., memos, scheduling of meetings and/or tasks), auditing, and payroll processing, among others.

RPA may constitute the core of hyper-automation system 10, and in certain embodiments, automation capabilities may be expanded with artificial intelligence (AI)/machine learning (ML), process mining, analytics, and/or other advanced tools. As hyper-automation system 10 learns processes, trains AI/ML models, and employs analytics, for example, more and more knowledge work may be automated, and computing systems in an organization, e.g., both those used by individuals and those that run autonomously, may all be engaged to be participants in the hyper-automation process. Hyper-automation systems of some embodiments allow users and organizations to efficiently and effectively discover, understand, and scale automations.

Exemplary hyper-automation system 10 includes RPA client computing systems 12a-c, such as a desktop computer, tablet computer, and smart phone, among others. Any desired client computing system may be used without deviating from the scope of the invention including, but not limited to, smart watches, laptop computers, servers, Internet-of-Things (IoT) devices, etc. Also, while FIG. 1 shows only three client computing systems 12a-c, any suitable number of client computing systems may be used without deviating from the scope of the invention. For instance, in some embodiments, dozens, hundreds, thousands, or millions of client computing systems may be used. Client computing systems 12a-c may be actively used by a user or run automatically without much or any user input.

Each illustrated client computing system 12a-c has respective automation module(s) 14a-c running thereon. Exemplary automation module(s) 14a-c may include, but are not limited to, RPA robots, part of an operating system, downloadable application(s) for the respective computing system, any other suitable software and/or hardware, or any combination of these without deviating from the scope of the invention.

In some embodiments, one or more of module(s) 14a-c may be listeners. Listeners monitor and record data pertaining to user interactions with respective computing systems and/or operations of unattended computing systems and send the data to a hyper-automation core system 30 via a communication network 15 (e.g., a local area network— LAN, a mobile communications network, a satellite communications network, the Internet, any combination thereof, etc.). The data may include, but is not limited to, which buttons were clicked, where a mouse was moved, the text that was entered in a field, that one window was minimized and another was opened, the application associated with a window, etc. In certain embodiments, the data from such listener processes may be sent periodically as part of a heartbeat message, or in response to a fulfillment of a data accumulation condition. One or more RPA servers 32 receive and store data from the listeners in a database, such as RPA database(s) 34 in FIG. 1.

Other exemplary automation module(s) 14a-c may execute the logic that actually implements the automation of a selected process. Stated otherwise, at least one automation module 14a-c may comprise a part of an RPA robot as further described below. Robots may be attended (i.e., requiring human intervention) or unattended. In some embodiments, multiple modules 14*a-c* or computing systems may participate in executing the logic of an automation. Some automations may orchestrate multiple modules 14*a-c*, may carry out various background processes and/or may perform Application Programming Interface (API) calls. Some robotic activities may cause a module 14*a-c* to wait for a selected task to be completed (possibly by another entity or automation module) before resuming the current workflow.

In some embodiments, hyper-automation core system 30 may run a conductor application on one or more servers, such as RPA server(s) 32. While FIG. 1 shows only one RPA server 32, multiple or many servers that are proximate to one another or in a distributed architecture may be employed without deviating from the scope of the invention. For instance, one or more of RPA server(s) 32 may be provided for conductor functionality, AI/ML model serving, authentication, governance, and or any other suitable functionality without deviating from the scope of the invention. In some embodiments, hyper-automation core system 30 may incorporate or be part of a public cloud architecture, a private cloud architecture, a hybrid cloud architecture, etc. In certain embodiments, hyper-automation core system 30 may host multiple software-based servers on one or more computing systems, such as RPA server(s) 32. In some embodiments, one or more servers of core hyper-automation system 30, such as RPA server(s) 32, may be implemented via one or more virtual machines (VMs).

In some embodiments, one or more of automation modules 14*a-c* may call one or more AI/ML models 36 deployed on or accessible by hyper-automation core 30. AI/ML models 36 may be trained for any suitable purpose without deviating from the scope of the invention. Two or more of AI/ML models 36 may be chained in some embodiments (e.g., in series, in parallel, or a combination thereof) such that they collectively provide collaborative output(s). Exemplary AI/ML models 36 may perform or assist with computer vision (CV), optical character recognition (OCR), document processing and/or understanding, semantic learning and/or analysis, analytical predictions, process discovery, task mining, testing, automatic RPA workflow generation, sequence extraction, clustering detection, audio-to-text translation, any combination thereof, etc. However, any desired number and/or type(s) of AI/ML models 36 may be used without deviating from the scope of the invention. Using multiple AI/ML models 36 may allow the system to develop a global picture of what is happening on a given computing system, for example. For instance, one AI/ML model could perform OCR, another could detect buttons, another could compare sequences, etc. Patterns may be determined individually by an AI/ML model or collectively by multiple AI/ML models. In certain embodiments, one or more AI/ML models 36 are deployed locally on at least one of RPA client computing systems 12*a-c*.

Hyper-automation system 10 may provide at least four main groups of functionality: (1) discovery; (2) building automations; (3) management; and (4) engagement. The discovery functionality may discover and provide automatic recommendations for different opportunities of automations of business processes. Such functionality may be implemented by one or more servers, such as RPA server 32. The discovery functionality may include providing an automation hub, process mining, task mining, and/or task capture in some embodiments.

The automation hub (e.g., UiPath Automation Hub™) may provide a mechanism for managing automation rollout with visibility and control. Automation ideas may be crowd-sourced from employees via a submission form, for example. Feasibility and return on investment (ROI) calculations for automating these ideas may be provided, documentation for future automations may be collected, and collaboration may be provided to get from automation discovery to build-out faster.

Process mining (e.g., via UiPath Automation Cloud™ and/or UiPath AI Center™) refers to the process of gathering and analyzing the data from applications (e.g., enterprise resource planning (ERP) applications, customer relation management (CRM) applications, email applications, call center applications, etc.) to identify what end-to-end processes exist in an organization and how to automate them effectively, as well as indicate what the impact of the automation will be. This data may be gleaned from RPA clients 12*a-c* by listeners, for example, and processed by RPA server(s) 32. One or more AI/ML models 36 may be employed for this purpose. This information may be exported to the automation hub to speed up implementation and avoid manual information transfer. The goal of process mining may be to increase business value by automating processes within an organization. Some examples of process mining goals include, but are not limited to, increasing profit, improving customer satisfaction, regulatory and/or contractual compliance, improving employee efficiency, etc.

Task mining (e.g., via UiPath Automation Cloud™ and/or UiPath AI Center™) identifies and aggregates workflows (e.g., employee workflows), and then applies AI to expose patterns and variations in day-to-day tasks, scoring such tasks for ease of automation and potential savings (e.g., time and/or cost savings). One or more AI/ML models 36 may be employed to uncover recurring task patterns in the data. Repetitive tasks that are ripe for automation may then be identified. This information may initially be provided by listener modules (e.g., automation modules 14*a-c*) and analyzed on servers of hyper-automation core 30. The findings from task mining process may be exported to process documents or to an RPA design application such as UiPath Studio™ to create and deploy automations more rapidly.

Task mining in some embodiments may include taking screenshots with user actions (e.g., mouse click locations, keyboard inputs, application windows and graphical elements the user was interacting with, timestamps for the interactions, etc.), collecting statistical data (e.g., execution time, number of actions, text entries, etc.), editing and annotating screenshots, specifying types of actions to be recorded, etc.

Task capture (e.g., via UiPath Automation Cloud™ and/or UiPath AI Center™) automatically documents attended processes as users work or provides a framework for unattended processes. Such documentation may include desired tasks to automate in the form of process definition documents (PDDs), skeletal workflows, capturing actions for each part of a process, recording user actions and automatically generating a comprehensive workflow diagram including the details about each step, Microsoft Word® documents, XAML files, and the like. Build-ready workflows may be exported directly to an RPA design application, such as UiPath Studio™. Task capture may simplify the requirements gathering process for both subject matter experts explaining a process and Center of Excellence (CoE) members providing production-grade automations.

The automation building functionality of hyper-automation system 10 may be accomplished via a computer program, illustrated as an RPA design application 40 in FIG. 1. Examples include UiPath Studio™, UiPath StudioX™, or UiPath Web™, among others. Such computer programs may be used to build and test automations for various applications and environments, such as web, mobile, SAP®, and virtualized desktops. In some embodiments, RPA design application 40 enables a human developer to design a workflow that effectively automates a target work process. A workflow typically comprises a sequence of custom automation steps, herein deemed RPA activities. Each activity includes at least one action performed by the robot, such as clicking a button, reading a file, writing to a spreadsheet cell, etc. Activities may be nested and/or embedded. In some embodiments, RPA design application 40 exposes a design interface and set of tools that give the developer control of the execution order and the relationship between activities of a workflow. In some embodiments, predefined activities, drag-and-drop modeling, and a workflow recorder may make automation easier with minimal coding. Document understanding functionality may be provided by AI activities for data extraction and interpretation that call one or more AI/ML models 36. Such automations may process virtually any document type and format, including tables, webpages, forms, signatures, and handwriting.

RPA design application 40 may also be used to seamlessly combine user interface (UI) automation with API automation, for example to provide API integration with various other applications, technologies, and platforms. A repository (e.g., UiPath Object Repository™) or marketplace (e.g., UiPath Marketplace™) for pre-built RPA and AI templates and solutions may be provided to allow developers to automate a wide variety of processes more quickly. Thus, when building automations, hyper-automation system 10 may provide user interfaces, development environments, API integration, pre-built and/or custom-built AI/ML models, development templates, integrated development environments (IDEs), and advanced AI capabilities. Hyper-automation system 10 may further enable deployment, management, configuration, monitoring, debugging, and maintenance of RPA robots for carrying out the automations designed using application 40.

The management functionality of hyper-automation system 10 may provide deployment, orchestration, test management, AI functionality, and optimization of automations across an organization. Other exemplary aspects of management functionality include DevOps activities such as continuous integration and continuous deployment of automations, as described herein. Management functionality may also act as an integration point with third-party solutions and applications for automation applications and/or RPA robots.

As an example of management functionality, a conductor application or service may facilitate provisioning, deployment, configuration, queuing, monitoring, logging, and interconnectivity of RPA robots, among others. Examples of such conductor applications/services include UiPath Orchestrator™ (which may be provided as part of the UiPath Automation Cloud™ or on premises, inside a virtual machine, or as a cloud-native single container suite via UiPath Automation Suite™). A test suite of applications/services (e.g., UiPath Test Suite™) may further provide test management to monitor the quality of deployed automations. The test suite may facilitate test planning and execution, meeting of requirements, and defect traceability. The test suite may include comprehensive test reporting. A DevOps management service as described below may enable a user to configure and execute DevOps pipelines for integrating, testing, enforcing standards on, and deploying automations to clients across a variety of computing environments.

Analytics software (e.g., UiPath Insights™) may track, measure, and manage the performance of deployed automations. The analytics software may align automation operations with specific key performance indicators (KPIs) and strategic outcomes for an organization. The analytics software may present results in a dashboard format for better understanding by human users.

AI management functionality may be provided by an AI center (e.g., UiPath AI Center™), which facilitates incorporation of AI/ML models into automations. Pre-built AI/ML models, model templates, and various deployment options may make such functionality accessible even to those who are not data scientists. Deployed automations (e.g., RPA robots) may call AI/ML models 36 from the AI center. Performance of the AI/ML models may be monitored. Models 36 may be trained and improved using human-validated data, such as that provided by a data review center as illustrated in FIG. 1. Human reviewers may provide labeled data (e.g., a training corpus) to hyper-automation core 30 via a review application 38 executing on a computer connected to network 15. Reviewers may also use application 38 to validate that predictions by AI/ML models 36 are accurate, and provide corrections otherwise. This dynamic input may then be saved as training data for retraining AI/ML models 36, and may be stored in a database such as RPA database 34, for example. The AI center may schedule and execute training jobs to train the new versions of AI/ML models 36 using the training data.

The engagement functionality of hyper-automation system 10 engages humans and automations as one team for seamless collaboration on desired processes. Low-code applications may be built (e.g., via UiPath Apps™) to connect to browser and legacy software. Applications may be created quickly using a web browser through a rich library of drag-and-drop controls, for instance. An application can be connected to a single automation or multiple automations. An action center (e.g., UiPath Action Center™) may provide a mechanism to hand off processes from automations to humans, and vice versa. Humans may provide approvals or escalations, make exceptions, etc. The automation may then perform the automatic functionality of a given workflow.

A local assistant may be provided as a launchpad for users to launch automations (e.g., UiPath Assistant™). This functionality may be provided in a tray provided by an operating system, for example, and may allow users to interact with RPA robots and RPA robot-powered applications on their computing systems. An interface may list automations/workflows approved for a given user and allow the user to run them. These may include ready-to-go automations from an automation marketplace, an internal automation store in an automation hub, etc. When automations run, they may run as a local instance in parallel with other processes on the computing system so users can use the computing system while the automation performs its actions. In certain embodiments, the assistant is integrated with the task capture functionality such that users can document their soon-to-be-automated processes from the assistant launchpad.

In another exemplary engagement functionality, Chatbots (e.g., UiPath Chatbots™), social messaging applications, and/or voice commands may enable users to run automations. This may simplify access to information, tools, and resources users need to interact with customers or perform other activities. For instance, a chatbot may respond to a command formulated in a natural language by triggering a robot configured to perform operations such as checking an order status, posting data in a CRM, etc.

In some embodiments, some functionality of hyper-automation system 10 may be provided iteratively and/or recursively. Processes can be discovered, automations can be built, tested, and deployed, performance may be measured, use of the automations may readily be provided to users, feedback may be obtained, AI/ML models may be trained and retrained, and the process may repeat itself. This facilitates a more robust and effective suite of automations.

Figure 2:
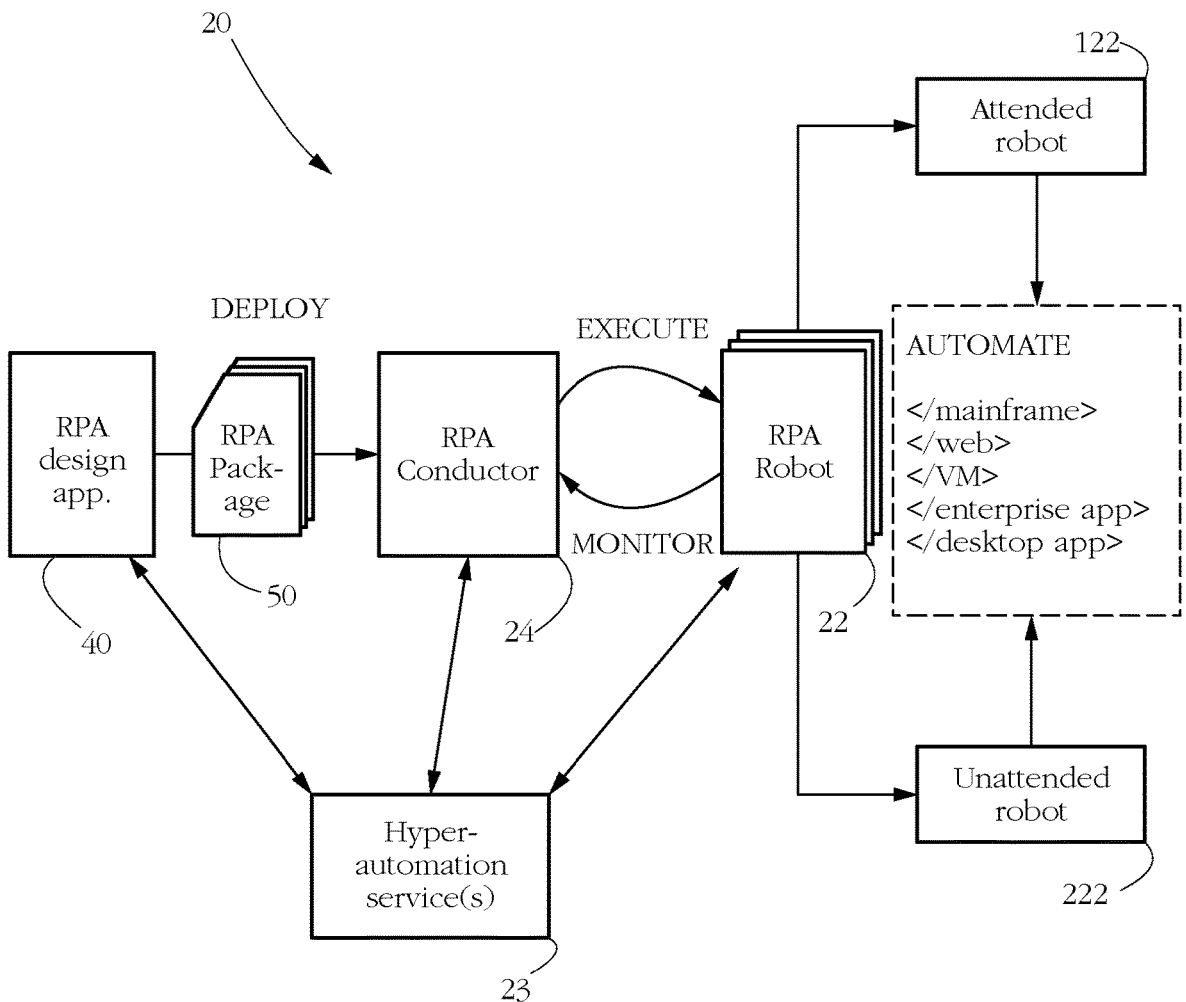
FIG. 2 illustrates an exemplary RPA system according to some embodiments of the present invention.

FIG. 2 illustrates exemplary components and operation of an RPA system 20 according to some embodiments of the present invention. RPA system 20 may form a part of hyper-automation system 10 of FIG. 1. RPA system 20 includes an RPA design application 40 that enables a developer to build automations, i.e., design and implement RPA workflows. For instance, application 40 may expose a user interface and set of tools that give the developer control of the execution order and the relationship between activities of a workflow. One commercial example of RPA design application 40 is UiPath Studio™. In some embodiments, application 40 provides an integrated development environment (IDE) combining robot design with software development operations (DevOps) such as continuous integration and/or continuous deployment, among others. Such functionality is described in detail below.

Some types of RPA workflows may include, but are not limited to, sequences, flowcharts, finite state machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed, it may be encoded in computer-readable form, such as an RPA script or an RPA package 50 (FIG. 2). An RPA script comprises a specification of a respective workflow, the specification comprehensible to (or interpretable by) RPA robot 22. RPA scripts may be formulated according to any data specification format known in the art, for instance in a version of an extensible markup language (XML), Javascript Object Notation (JSON), or a programming language such as C #, Visual Basic, Java, etc. Alternatively, RPA scripts may be formulated in an RPA-specific version of bytecode, or even as a sequence of instructions formulated in a natural language such as English, Spanish, Japanese, etc. In some embodiments, one or more related RPA scripts are bundled together with other files and/or metadata, to form RPA package 50. For instance, beside RPA scripts, RPA package 50 may comprise a specification of a resource required for executing the respective workflow(s). Exemplary resources include a location of a file (e.g., path, URL), a filename, and a set of credentials for accessing a particular machine, computer program, or service, among others. In what is commonly known in the art as a 'build', RPA scripts may be pre-compiled into a set of executable files which may include a main executable and accompanying libraries, resource specifications and/or metadata, to form RPA package 50.

Package 50 may use any data specification format known in the art. For instance, some embodiments of package 50 comprise a NuGet package of .NET assembly files.

A skilled artisan will appreciate that RPA design application 40 may comprise multiple components/modules, which may execute on distinct physical machines. In one such example illustrating a cloud computing embodiment of the present invention, RPA design application 40 may execute in a client-server configuration, wherein one component of application 40 may expose an automation design interface on the developer's computer, and another component of application 40 executing on a remote server may assemble the workflow and formulate/output RPA package 50. For instance, a developer may access the automation design interface via a web browser executing on the developer's computer, while the software processing the user input received at the developer's computer actually executes on the server.

In some embodiments, a workflow developed in RPA design application 40 is deployed to an RPA conductor 24, for instance in the form of an RPA package as described above. Per the above, in some embodiments, conductor 24 may be part of hyper-automation core system 30 illustrated in FIG. 1. One commercial example of conductor 24 is UiPath Orchestrator™.

Conductor 24 orchestrates one or more RPA robots 22 that execute the respective workflow. Such 'orchestration' may include creating, monitoring, and deploying computing resources for robots 22 in an environment such as a cloud computing system and/or a local computer. Orchestration may further comprise, among others, deployment, configuration, queueing, monitoring, logging of robots 22, and/or providing interconnectivity for robots 22. Provisioning may include creating and maintaining connections between robots 22 and conductor 24. Deployment may include ensuring the correct delivery of software (e.g, RPA packages 50) to robots 22 for execution. Configuration may include maintenance and delivery of robot environments and workflow configurations. Queueing may include providing management of job queues and queue items. Monitoring may include keeping track of robot state and maintaining user permissions. Logging may include storing and indexing logs to a database and/or another storage mechanism (e.g., SQL, ElasticSearch®, Redis®). Conductor 24 may further act as a centralized point of communication for third-party solutions and/or applications.

RPA robots 22 are execution agents (e.g., computer programs) that implement automation workflows targeting various systems and applications including, but not limited to, mainframes, web applications, virtual machines, enterprise applications (e.g., those produced by SAP®, SalesForce®, Oracle®, etc.), desktop and laptop applications, mobile device applications, wearable computer applications, etc. One commercial example of robot 22 is UiPath Robots™. Types of robots may include attended robots 122, unattended robots 222, development robots (similar to unattended robots, but used for development and testing purposes), and nonproduction robots (similar to attended robots, but used for development and testing purposes), among others.

Some activities of attended robots 122 are triggered by user events and/or commands and operate alongside a human operator on the same computing system. In some embodiments, attended robots 122 can only be started from a robot tray or from a command prompt and thus cannot be entirely controlled by conductor 24 and cannot run under a locked screen, for example. Unattended robots may run unattended in remote virtual environments and may be responsible for remote execution, monitoring, scheduling, and providing support for work queues.

In some embodiments executing in a Windows® environment, robot 22 installs a Microsoft Windows® Service Control Manager (SCM)—managed service by default. As a result, such robots can open interactive Windows® sessions under the local system account and have the processor privilege of a Windows® service. For instance, a console application may be launched by a SCM-managed robot. In some embodiments, robot 22 may be installed at a user level of processor privilege (user mode, ring 3). Such a robot has the same rights as the user under which the respective robot has been installed. For instance, such a robot may launch any application that the respective user can. On computing systems that support multiple interactive sessions running simultaneously (e.g., Windows® Server 2012), multiple robots may be running at the same time, each in a separate Windows® session, using different usernames.

In some embodiments, robots 22 are split into several components, each being dedicated to a particular automation task. The robot components in some embodiments include, but are not limited to, SCM-managed robot services, user-mode robot services, executors, agents, and command-line. Depending on platform details, SCM-managed and/or user-mode robot services manage and monitor Windows® sessions and act as a proxy between conductor 24 and the host machines (i.e., the computing systems on which robots 22 execute). These services are trusted with and manage the credentials for robots 22. The command line is a client of the service(s), a console application that can be used to launch jobs and display or otherwise process their output.

Figure 3:
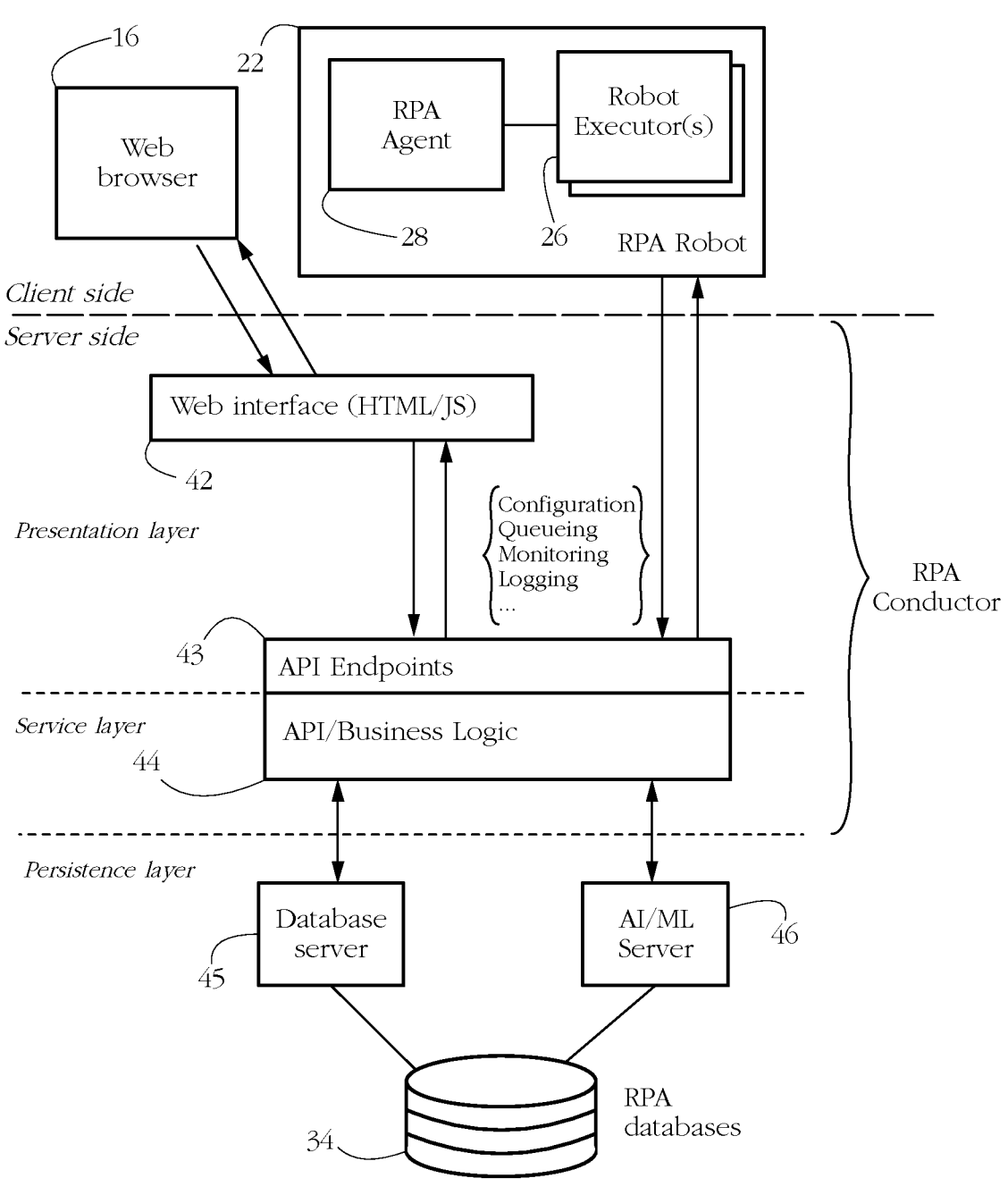
FIG. 3 shows an exemplary deployed RPA system executing in a client-server configuration according to some embodiments of the present invention.

An exemplary set of robot executors 26 and an RPA agent 28 are illustrated in FIG. 3. Robot executors 26 may run given jobs under a Windows® session. Executors 26 are configured to receive RPA package 50 specifying a workflow (e.g., sequence of robotic activities), and to execute the respective package which effectively amounts to carrying out the respective sequence of RPA activities. In some embodiments, package 50 comprises pre-compiled executable code. In other exemplary embodiments, robot executor(s) 26 comprise an interpreter (e.g., a just-in-time interpreter or compiler) configured to translate an RPA script comprising a workflow specification (e.g., bytecode, XML, JSON, etc.) into runtime code comprising processor instructions for carrying out the respective workflow. Executing RPA package 50 may thus comprise executor(s) 26 translating a workflow specification included in package 50 and instructing a processor of the respective host machine to load the resulting runtime code into memory and to launch the runtime code into execution.

RPA agent 28 may manage the operation of robot executor(s) 26. For instance, RPA agent 28 may select tasks/scripts for execution by robot executor(s) 26 according to an input from a human operator and/or according to a schedule. Agent 28 may start and stop jobs and configure various operational parameters of executor(s) 22. When robot 22 includes multiple executors 26, agent 28 may coordinate their activities and/or inter-process communication. RPA agent 28 may further manage communication between RPA robot 22 and conductor 24 and/or other entities.

Exemplary RPA system 20 in FIG. 2 forms a part of a hyper-automation system 10 (see FIG. 1). As such, robots 22 may interact with various components and use various aspects of hyper-automation core system 30, illustrated generically as hyper-automation services 23 in FIG. 2. For instance, developers may use RPA design application 40 to build and test RPA robots 22 that utilize AI/ML models 36. Such RPA robots 22 may send input for execution of the AI/ML model(s) and receive output therefrom via hyper-automation core system 30. Robot 22 may be a listener, as described above. These listeners may provide information to core hyper-automation system 30 regarding what users are doing when they use their computing systems. This information may then be used by hyper-automation system 30 for process mining, task mining, task capture, etc. In another exemplary embodiment, hyper-automation services 23 may expose data labeling functionality to user of the computing system hosting robot 22 or to another computing system that robot 22 provides information to. For instance, if robot 22 calls a computer vision AI/ML model 36 but the respective model does not correctly identify a button on the screen, the user may explicitly provide a correct identification. Such information may be passed on to hyper-automation core system 30 and then used for re-training the respective AI/ML model.

In some embodiments, selected components of hyper-automation system 10 and/or RPA system 20 may execute in a client-server configuration. In one such configuration illustrated in FIG. 3, RPA robot 20 including executor(s) 26 and RPA agent 28 may execute on a client side, for instance on one of RPA client computers 12a-c in FIG. 1. In turn, the functionality of conductor 24 and/or other services of hyper-automation core system 30 may be implemented on the server side, e.g., on remote RPA servers 32 (FIG. 1). It should be noted that the client side, the server side, or both, may include any desired number of computing systems (e.g., physical or virtual machines) without deviating from the scope of the invention. The illustrated RPA system may be cloud-based, on-premises, or a combination thereof, offering enterprise-level, user-level, or device-level automation solutions for automation of different work processes.

Robot 22 may run several jobs/workflows concurrently. RPA agent 28 (e.g., a Windows® service) may act as a single client-side point of contact of multiple executors 26. Agent 28 may further manage communication between robot 22 and conductor 24. In some embodiments, communication is initiated by RPA agent 28, which may open a WebSocket channel to conductor 24. Agent 28 may subsequently use the channel to transmit notifications regarding the state of each executor 26 to conductor 24, for instance as a heartbeat signal. In turn, conductor 24 may use the channel to transmit acknowledgements, job requests, and other data such as RPA packages 50 to robot 22.

In one embodiment as illustrated in FIG. 3, conductor 24 includes a web interface 42 and a set of service modules comprising a set of Application Programming Interface (API) endpoints 43 and service APIs/business logic 44. A user may interact with conductor 24 via web interface 42 (e.g., by opening a dedicated web page on a browser 16), to instruct conductor 24 to carry out actions such as scheduling and/or starting jobs on robot 22, creating robot groups/pools, assigning workflows to robots, adding/removing data to/from queues, analyzing logs per robot or workflow, etc. Interface 42 may be implemented using Hypertext Markup Language (HTML), JavaScript (JS), or any other data format known in the art.

Conductor 24 may carry out actions requested by the user by selectively calling service APIs/business logic 44 via endpoints 43. In addition, some embodiments use API endpoints 43 to communicate between RPA robot 22 and conductor 24, for tasks such as configuration, logging, deployment, monitoring, and queueing, among others. API endpoints 43 may be set up using any data format and/or communication protocol known in the art. For instance, API endpoints 43 may be Representational State Transfer (REST) and/or Open Data Protocol (OData) compliant.

Configuration endpoints may be used to define and configure application users, permissions, robots, assets, releases, etc. Logging endpoints may be used to log different information, such as errors, explicit messages sent by robot 22, and other environment-specific information. Deployment endpoints may be used by robot 22 to query the version of RPA package 50 to be executed. Queueing endpoints may be responsible for queues and queue item management, such as adding data to a queue, obtaining a transaction from the queue, setting the status of a transaction, etc. Monitoring endpoints may monitor the execution of web interface 42 and/or RPA agent 28.

Service APIs 44 comprise computer programs accessed/called through configuration of an appropriate API access path, e.g., based on whether conductor 24 and an overall hyper-automation system have an on-premises deployment type or a cloud-based deployment type. Exemplary APIs 44 provide custom methods for querying stats about various entities registered with conductor 24. Each logical resource may be an OData entity in some embodiments. In such an entity, components such as a robot, process, queue, etc., may have properties, relationships, and operations. APIs 44 may be consumed by web application 42 and/or RPA agent 28 by getting the appropriate API access information from conductor 24, or by registering an external application to use the OAuth flow mechanism.

In some embodiments, a persistence layer of server-side operations implements a database service. A database server 45 may be configured to selectively store and/or retrieve data to/from RPA databases 34. Database server 45 and database 34 may employ any data storage protocol and format known in the art, such as structured query language (SQL), ElasticSearch®, and Redis®, among others. Exemplary data stored/retrieved by server 45 may include configuration parameters of robots 22 and robot pools, as well as data characterizing workflows executed by robots 22, data characterizing users, roles, schedules, queues, etc. In some embodiments, such information is managed via web interface 42. Another exemplary category of data stored and/or retrieved by database server 45 includes data characterizing the current state of each executing robot, as well as messages logged by robots during execution. Such data may be transmitted by robots 22 via API endpoints 43 and centrally managed by conductor 24, for instance via API logic 44.

Server 45 and database 34 also store/manage process mining, task mining, and/or task capture-related data, for instance received from listener modules executing on the client side as described above. In one such example, listeners may record user actions performed on their local hosts (e.g., clicks, typed characters, locations, applications, active elements, times, etc.) and then convert these into a suitable format to be provided to and stored in database 34.

In some embodiments, a dedicated AI/ML server 46 facilitates incorporation of AI/ML models 36 into automations. Pre-built AI/ML models, model templates, and various deployment options may make such functionality accessible even to operators who lack advanced or specialized AI/ML knowledge. Deployed robots 22 may call AI/ML models 36 by interfacing with AI/ML server 46. Performance of the deployed AI/ML models 36 may be monitored and the respective models may be re-trained and improved using human-validated data. AI/ML server 46 may schedule and execute training jobs and manage training corpora. AI/ML server 46 may further manage data pertaining to AI/ML models 36, document understanding technologies and frameworks, algorithms and software packages for various AI/ML capabilities including, but not limited to, intent analysis, natural language processing (NLP), speech analysis and synthesis, computer vision, etc.

Some embodiments of the present invention employ parts of hyper-automation system 10 to automate DevOps activities. DevOps herein denotes software development operations wherein a plurality of developers and machines collaborate to design, test, and deploy software to clients. DevOps activities may include, among others, continuous integration and continuous deployment. The term 'integration' herein refers to contributing parts, changes, and/or updates to the target software, for instance merging multiple individual versions/working copies of the respective software into a single 'master' or 'main' version. Said individual parts or versions may be provided by the same developer, or by distinct developers collaborating on the respective project. Software integration itself may include multiple steps, such as downloading individual versions, comparing the respective versions, testing and/or validating the respective code, and merging the respective versions into a master. 'Deployment' herein denotes transmitting the respective main/master version to a client's production environment. The modifier 'continuous' indicates that integration and/or deployment may occur repeatedly and relatively frequently (e.g., several times a day).

Without loss of generality, the following description will focus on RPA DevOps, i.e., DevOps directed at RPA software, such as a continuous integration and/or deployment of a target RPA workflow. A skilled artisan will know that the present disclosure may be adapted to situations in which the object of DevOps is a complex software package comprising multiple RPA workflows.

Figure 4:
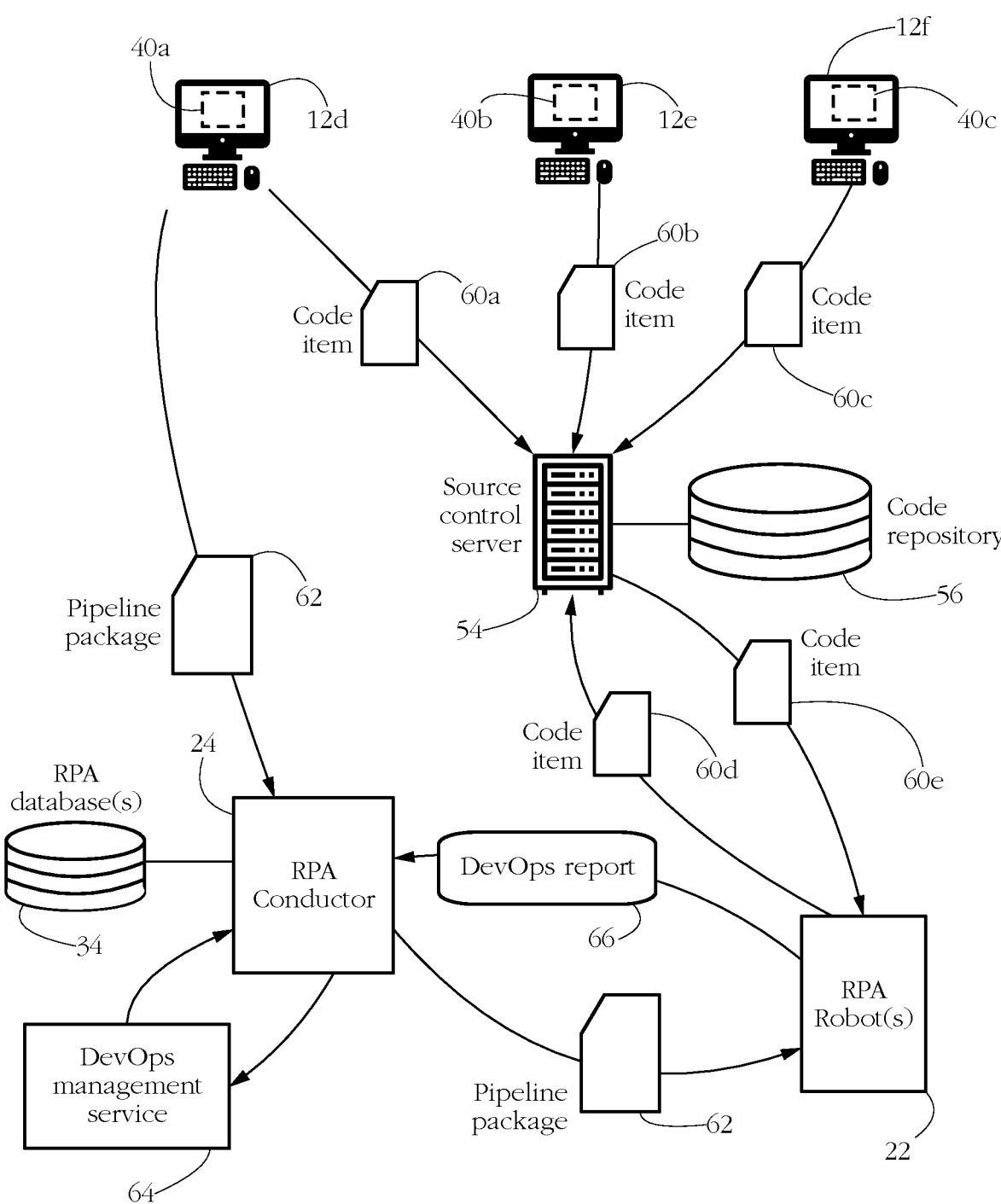
FIG. 4 illustrates an exemplary RPA system for carrying out DevOps activities according to some embodiments of the present invention.

FIG. 4 shows an exemplary embodiment of an RPA system for carrying out DevOps activities according to some embodiments of the present invention. In one exemplary use-case scenario as illustrated, a developer may use an instance of RPA design application 40*a* executing on an RPA client computer 12*d* to design an RPA workflow. As the design process progresses, the developer may transmit a current version/working copy of the respective workflow specification (illustrated as code item 60*a* in FIG. 4) to a code repository 56. In a more complex code development scenario, multiple RPA client computers 12*d-e-f* collaborate to develop the target RPA workflow. Each member of an RPA design team may use a respective local instance of RPA design application 40*a-b-c* to configure various aspects of the target RPA workflow. For example, each developer may be charged with creating a different section (subset of activities) of the target workflow, the respective section directed at carrying out a specific task, etc. By working independently, each developer may end up with a local working version of the target RPA workflow, which differs from previous versions, as well as from versions created by his/her colleagues. All contributing developers may submit respective code items 60*a-b-c* to code repository 56, for instance according to a schedule (e.g., at the end of each working day, at fixed time intervals, etc.).

Each code item 60*a-b-c* may represent a distinct working version (or distinct part) of the target RPA workflow, and may comprise an RPA script encoding a sequence of activities to be executed by an RPA robot, formulated for instance in a version of JavaScript® Object Notation (JSON) or Extensible Markup Language (XML). In another example, code items 60*a-b-c* may include RPA packages as described above.

In some embodiments, code repository 56 comprises an ordered collection of software items (computer programs, libraries, code packages, etc.). The collection is indexed and/or otherwise accompanied by metadata enabling a selective retrieval of each stored item according to various criteria. In some embodiments, a source control server 54 performs a selective insertion and/or retrieval of items into/from repository 56, and may further generate and manage metadata. In one such example, server 54 may tag each item stored in repository 56 with metadata indicating a source of the respective item, an identity of the developer providing the respective item, an indicator of a software collection/project that the respective item belongs to, and a timestamp, among others. In some embodiments, source control server 54 may be further configured to construct a new software item (e.g., 'master' version of a target RPA workflow) according to multiple software items currently stored in repository 56 (e.g., distinct versions or parts of the target RPA workflow). Several types and formats of code repositories and source control systems are known in the art, including Git™ and Fossil™, among others. Source control server 54 may form a part of hyper-automation core 30, but alternative embodiments may use any publicly available source control service, such as GitHub™, among others.

Some embodiments of the present invention leverage the architecture and functionality of hyper-automation and RPA systems described above in relation to FIGS. 1-2-3 to facilitate software development operations such as a continuous integration and/or continuous deployment of the target RPA workflow. For instance, in some embodiments, a developer may use his/her local instance of RPA design application 40a to construct a pipeline package 62 comprising a specification of a DevOps pipeline for automating a continuous integration and/or a continuous deployment of the target RPA workflow.

In some embodiments, pipeline package 62 is formulated/encoded as an RPA workflow and configured to be executed by RPA robot(s) 22 forming a part of an RPA system as described above. In one such example illustrated in FIG. 4, pipeline package 62 is generated by RPA design application 40a and uploaded to RPA conductor 24 as any other RPA package. Conductor 24 may then create and manage computing resources (e.g., instantiate a virtual machine on a cloud computing system) for RPA robot(s) 22, instantiate robot(s) 22 and assign pipeline package 62 for execution to robot(s) 22.

RPA robot(s) 22 may then execute pipeline package 62 and send back a DevOps report 66 to RPA conductor 24 and/or to a DevOps management service as described below. Executing pipeline package 62 may include carrying out various DevOps activities as specified in package 62, for instance pulling a selected version of the target RPA workflow (illustrated as code item 50d in FIG. 4) from code repository 56, running a set of tests on the pulled version, validating, and deploying the respective version to a client's production environment. In some embodiments, robot(s) 22 may further merge multiple working versions of the target RPA workflow into a 'main' or 'master' version (illustrated as code item 50e in FIG. 4), and upload the respective 'master' version of the target RPA workflow to code repository 56. More details on such exemplary activities are given below.

In some embodiments, execution of pipeline package 62 may be customized and monitored via a dedicated user interface and/or web service illustrated as a DevOps management service 64. Service 64 may form a part of hyper-automation services 23 in FIG. 2. A commercial example of service 64 is UiPath Automation Ops™. In one exemplary use-case scenario, a developer may use service 64 to set parameter values controlling execution of pipeline package 62, to visualize a progress of the respective pipeline, to manage error reporting, etc. More details on service 64 are given below.

Figure 5:
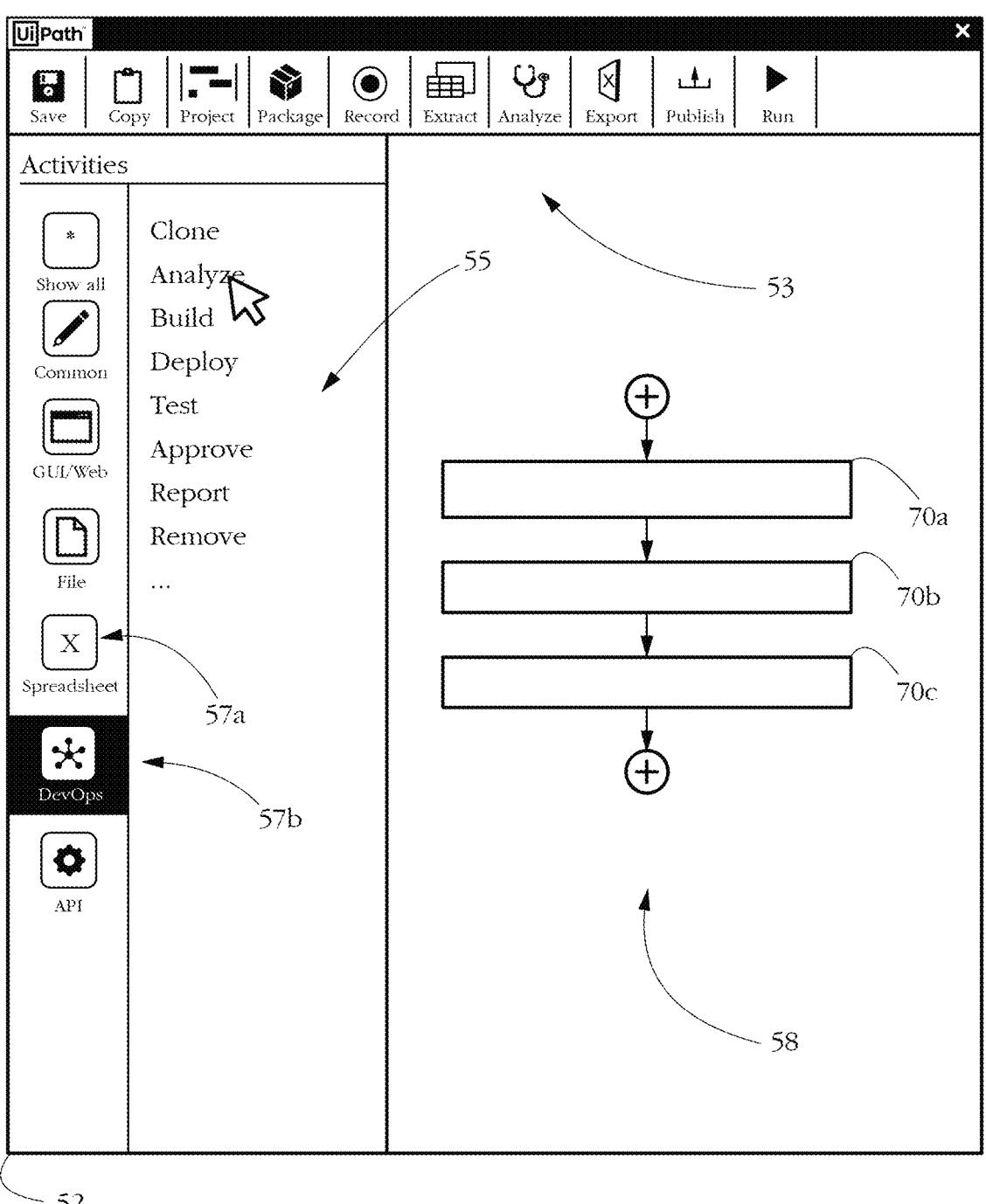
FIG. 5 shows an exemplary design interface exposed by an RPA design application according to some embodiments of the present invention.

FIG. 5 shows an exemplary design interface 52 exposed by RPA design application 40 according to some embodiments of the present invention. Interface 52 may be configured to enable a user to build automations by using a set of intuitive visual and/or drag-and-drop tools, instead of coding per se. For instance, interface 52 may enable the user to assemble a desired workflow from a set of individual building blocks arranged in sequence. Such building blocks may comprise individual RPA activities, such as opening an instance of an application (e.g., web browser), clicking on a UI element (e.g., button), filling out a form field, etc. The granularity of such individual building blocks may vary and may be controlled by the user. For instance, some RPA activities may themselves consist of subsequences of other RPA activities. As such, interface 52 may enable the user to group several activities into a new building block/RPA activity.

In one example illustrated in FIG. 5, design interface 52 comprises a main menu/ribbon 53 including a plurality of menu items for managing RPA projects. Ribbon 53 may comprise, for instance, individual controls for opening, saving, exporting, and executing the current workflow, and recording a set of actions to be performed by robot 22, among others.

Design interface 52 may further expose an activity menu 55 listing a plurality of available activities for building RPA workflows. In some embodiments, activity menu 55 may enable the user to access/use a broad variety of robotic activities, including GUI activities, browser activities, mail activities, spreadsheet activities, file activities, API activities, activities for interacting with various software platforms and services such as SAP™, and AI/ML activities, among others. Exemplary GUI activities may comprise activities for interacting with a GUI, such as identifying various GUI elements (text, images, and controls), clicking a button, executing a screen gesture (pinching, swiping, etc.), filling in a form field, and scraping/copying data from a GUI, among others. Exemplary browser activities may include opening a browser window and navigating to a selected URL. Mail activities may include activities for sending and receiving electronic communications (e.g., email, instant messaging, etc.). Spreadsheet activities may include selecting spreadsheet cells according to various criteria, copying a content of a selected cell, and entering data into a selected cell, among others. File activities may include, for instance, accessing various local or network addresses, downloading, uploading, opening, editing, and deleting files. API activities may include calling various pre-defined external APIs. Exemplary AI/ML activities may include computer vision-related activities such as text and/or image recognition, among others.

For convenience, activity menu 55 may be organized into a hierarchy of submenus. In the example of FIG. 5, available activities are organized into submenus according to various criteria, such as a type of target application (e.g., activities for interacting with GUIs are grouped together into a submenu, while activities for interacting with a spreadsheet are grouped into another submenu). Other exemplary grouping criteria may include a type of target object: file-related activities may be grouped together into a submenu, while image-related activities may be grouped into another submenu. A skilled artisan will know that such groupings are given only as examples and are not meant to be limiting.

In some embodiments of the present invention, activity menu 55 further exposes a DevOps menu listing a set of pre-defined, dedicated DevOps activities, as illustrated in FIG. 5. While such activities may be grouped together into a separate menu, DevOps activities are preferably reachable through the same visual interface and/or menu structure as any other available RPA activity, thus enabling a developer to build sophisticated workflows that combine DevOps activities with RPA activities from any other menu or category. In some embodiments, a DevOps menu is co-displayed with another RPA activity menu within the same window or menu area of interface 52. Alternatively, design interface 52 may co-display controls (e.g., icons, hyperlinks) for accessing a DevOps menu with controls for accessing activity menus listing other types of RPA activities. An example of such co-display is shown in FIG. 5, wherein a menu control 57*b* for accessing a menu of DevOps activities is co-displayed with a menu control 57*a* for accessing a menu of RPA spreadsheet activities.

Exemplary DevOps activities may include clone, analyze, merge, build, deploy, test, approve, report, and remove activities, among others. Each such activity may have a specific input and output, as well as a set of execution parameters, which may be set either at design time (via design application 40) or later via a user interface exposed by DevOps management service 64.

An exemplary 'clone' activity may create a working copy of at least a part of code repository 56 to a storage device managed by RPA conductor 24. The retrieved code may comprise, for instance, a selected version of a target RPA workflow, or multiple versions of the target RPA workflow. In some embodiments, executing a clone activity may cause RPA robot 22 to issue a request (e.g., a Git™ Clone command) to source control server 54, the request identifying the target object, and in response, to receive the requested object, illustrated as code item 60*e* in FIG. 4. Exemplary inputs of a DevOps 'clone' activity may include, among others, connection parameter values (e.g., credentials) for connecting to server 54, an identifier (e.g., path, URL) of the requested object, and a location (e.g., path, URL) of the local working copy. An exemplary output may include an indicator of whether the clone activity was successful, and/or a set of error codes indicating a cause of a failure.

An exemplary 'analyze' activity may perform a static code analysis of the target RPA workflow, to determine for instance whether the respective code complies with a set of code writing standards and/or other policies. Standards and/or policies may be project-specific, client-specific, or universal, and may be pre-defined in an external source, e.g., as a JSON file encoding a set of rules that the respective code should obey. Such rules may indicate for instance, function and variable naming conventions, a maximum count of function arguments, etc. Standards and/or policies may further define a hierarchy of rules, wherein breaking a selected rule may trigger a selected response. For instance, some rules may be recommendations or best practices, while others may be more stringent (e.g., breaking any of these may prevent the respective code from executing). To execute an 'analyze' activity, some embodiments of robot 22 may call a dedicated static code analysis module, which may execute locally or as a remote service accessible as part of hyper-automation services 23 (FIG. 2). Exemplary inputs of a DevOps 'analyze' activity may include a set of parameter values for passing onto the code analysis module/service, e.g., a selection of rules. When code analysis standards/policies are project or client-specific, another input may comprise a location (e.g., path, URL) of a custom policy JSON file. Another input may comprise a location of the local working copy of the target workflow. An exemplary output of a DevOps 'analyze' activity may comprise an error list detailing various instances and aspects of non-compliance, and an indicator of whether the respective activity was completed successfully.

An exemplary DevOps 'build' activity may compile the locally cloned code of the target RPA workflow into an executable package according to a format and specificities of the client's environment. For instance, executing a build activity may cause robot 22 to produce an RPA package 50 including alongside the specification of the RPA workflow, metadata such as a name, a version, an icon, and a set of release notes specific to the respective version of the respective RPA workflow, among others. In some embodiments, to execute the build activity, robot 22 may call a dedicated compiler module, which may execute locally or remotely, as a service included in hyper-automation services 23 (FIG. 2). In response to creating the package, some embodiments of robot 22 may further upload the respective package to repository 56 (illustrated as item 60*d* in FIG. 4). Exemplary inputs of a 'build' activity may include a location of the resulting RPA package 50 (e.g., destination folder), a location of the local working copy of the target workflow, a package name, a filename for the output package, a version indicator, and a location of a file containing a set of release notes. Some embodiments of robot 22 may automatically retrieve a set of input values such as a name and version by querying source control server 54, or may determine them according to an output of a previously-executed 'clone' activity. Exemplary outputs of a DevOps 'build' activity include a path/URL of the resulting RPA package, an indicator of whether the build was successful and/or a set of error codes indicating a reason for failure.

An exemplary DevOps 'deploy' activity may move and/or configure a compiled RPA package for execution in a client's target computing environment. Deployment may include physically moving a set of files to a specific computer system (e.g., cloud or on-premises), as well as collaborating with RPA conductor 24 to allocate computing resources, create client-specific instances of RPA robots for executing the deployed RPA workflow, and set up the related architecture and services that enable the client to configure, schedule, and monitor the execution of the respective workflow. Some embodiments of robot 22 may execute such activities via an exchange of messages with conductor 24, for instance via REST endpoints 43 (FIG. 3). Exemplary inputs of a DevOps 'deploy' activity include a target path to a folder storing the deployed package, and an identifier of a data structure used by RPA conductor 24 to manage execution of the deployed packages. In an exemplary embodiment using UiPath Orchestrator™, such a data structure may comprise an orchestrator process, and the respective input to the 'deploy' activity may comprise a path to a folder hosting the respective orchestrator process. An exemplary output of a DevOps 'deploy' activity may include an indicator of whether the deployment was successful.

An exemplary DevOps 'test' activity may run a set of runtime tests of the target RPA workflow. Some embodiments may call a dedicated software testing module or service to carry out the actual testing and report back on the results. The testing service may be integrated into RPA conductor 24 or may form a part of hyper-automation services 23. One example of such a service is UiPath Test Suite™, which provides an extensive set of tools for setting up detailed testing and reporting. In one such exemplary embodiment, a developer may create a test suite associated with the target RPA workflow and register the respective test suite with RPA conductor 24. The DevOps 'test' activity may then receive a pointer to the respective test suite as input. In response, robot 22 may interface with the testing service (e.g., conductor 24) to execute the respective test suite and receive testing results, which it may then produce as an exemplary output of the DevOps 'test' activity.

An exemplary DevOps 'approve' activity may suspend execution of the DevOps pipeline at a selected stage, to request and receive input from a human operator. Such manual approval may be required in some cases prior to deploying a target RPA workflow into production. In some embodiments, to execute the 'approve' activity, robot 22 may call on a user interaction module or service, which may form a part of hyper-automation services 23 (FIG. 2) or may be integrated with RPA conductor 24. An example of such a service is UiPath Action Center™. In such embodiments, robot 22 may suspend execution of the DevOps pipeline, signal to the user interaction center to await human input, and receive a result of the respective input (for instance an indicator of whether the stakeholder approved the respective version of the target workflow or not). In response to receiving the response from the service, robot 22 may resume execution of the pipeline or not, according to the response. An exemplary input of a DevOps 'approve' activity may include a list of names, ID and/or credentials of stakeholders authorized to approve the respective project. Some embodiments may pass such input to the user interaction module/service. An exemplary output of a DevOps 'approve' activity may include an indicator of whether the respective activity was successful.

An exemplary DevOps 'report' activity may transmit a DevOps report 66 (FIG. 6) to RPA conductor 24 and/or to DevOps management service 64 at a selected stage during the respective pipeline workflow. Report 66 may include, for instance, a result of executing a previous DevOps activity, such as 'build', 'test', etc. In some embodiments, executing a 'report' activity causes robot 22 to call a dedicated data analytics module or service which may form a part of hyper-automation services 23, and which extends reporting with other functionality such as data analytics, calculating various software performance measures, and displaying such results to a user by way of a dashboard. One example of such a data analytics service is UiPath Insights™.

An exemplary DevOps 'remove' activity may be executed in response to other DevOps activities and may instruct robot 22 to remove traces of executing the respective pipeline, such as a local working copy of the target RPA workflow created by a 'clone' activity, as well as other files and settings, from computer systems and storage media participating in the execution of the respective pipeline. An exemplary input of a DevOps 'remove' activity comprises a path/URL of the respective project/package/RPA workflow. An exemplary output may include an indicator of whether the 'remove' activity completed successfully and/or a set of error codes indicative of a reason for failure.

In some embodiments, RPA design interface 52 (FIG. 5) further comprises an area for displaying a diagram of an RPA workflow 58 currently under construction. The workflow diagram may comprise a visual representation of a set of already selected robot activities arranged in sequence according to a desired order of execution of the respective activities. In the example of FIG. 5, individual activities are represented by activity containers 70*a-c* connected by arrows in the manner of a computer flowchart. In some embodiments, the user may access each individual activity by clicking inside the respective activity container 70*a-c*. In response to detecting such a click, some embodiments may expose an activity configuration interface enabling the user to configure various aspects of the respective activity, as further detailed below. Configuration options may include an activity type (e.g., selectable from activity menu 55), name, and various activity-specific parameters. In some embodiments, interface 52 may further enable the user to insert, delete, and change the order of containers, for instance using drag-and-drop manipulations. A user may further group multiple selected activities/containers together, to form a composite activity represented by its own container with a name, visual style, and configuration options. Such a container may for instance be represented as a box drawn around the selected member activities/containers.

By using tools and activity menus 55 exposed by interface 52, a developer may effectively construct a DevOps pipeline workflow, and further export the respective workflow as pipeline package 62 to RPA conductor 24 (FIG. 4). By exposing a broad variety of RPA activities via menus 55, some embodiments enable the developer to mix DevOps activities with other kinds of RPA activities, which substantially expands the functionality of a DevOps pipeline compared to a pipeline built using conventional DevOps software. Stated otherwise, a DevOps pipeline according to some embodiments of the present invention may include activities for designing RPA workflows alongside activities for performing DevOps on such RPA workflows.

One such exemplary DevOps pipeline may run some tests on a target RPA workflow, then write various results of the tests to a selected Microsoft Excel™ spreadsheet, before executing a build. FIGS. 6-A-B-C illustrate a succession of steps in designing an exemplary DevOps pipeline workflow 58 instructing an RPA robot to execute the above pipeline. In FIG. 6-A, a developer may add a DevOps 'test' activity 70*a* by selecting the respective activity type from a DevOps activity menu 55*a*. After configuring the testing activity, in FIG. 6-B the developer may add another activity 70*b* to workflow 58. To define activity 70*b* as an activity of writing to a selected spreadsheet cell, the developer may invoke another activity menu 55*b* listing RPA spreadsheet activities, and select the desired activity type from the options displayed by menu 55*b*. FIG. 6-C shows the developer returning to DevOps activity menu 55*a* to select a 'build' activity and insert a respective activity 70*c* into pipeline workflow 58. A skilled artisan will know that the illustrated sequence of steps is only exemplary and not meant to be limiting. The illustrated steps need not be executed in the order presented above. Also, even though the example above only comprises one spreadsheet activity, workflow 58 may include any number of activities selected from various activity menus exposed by design interface 52. For instance, activity 70*b* may represent a nested subsequence of activities including opening the respective spreadsheet, identifying the target spreadsheet cell, and writing data to the target cell, among others.

Figure 7:
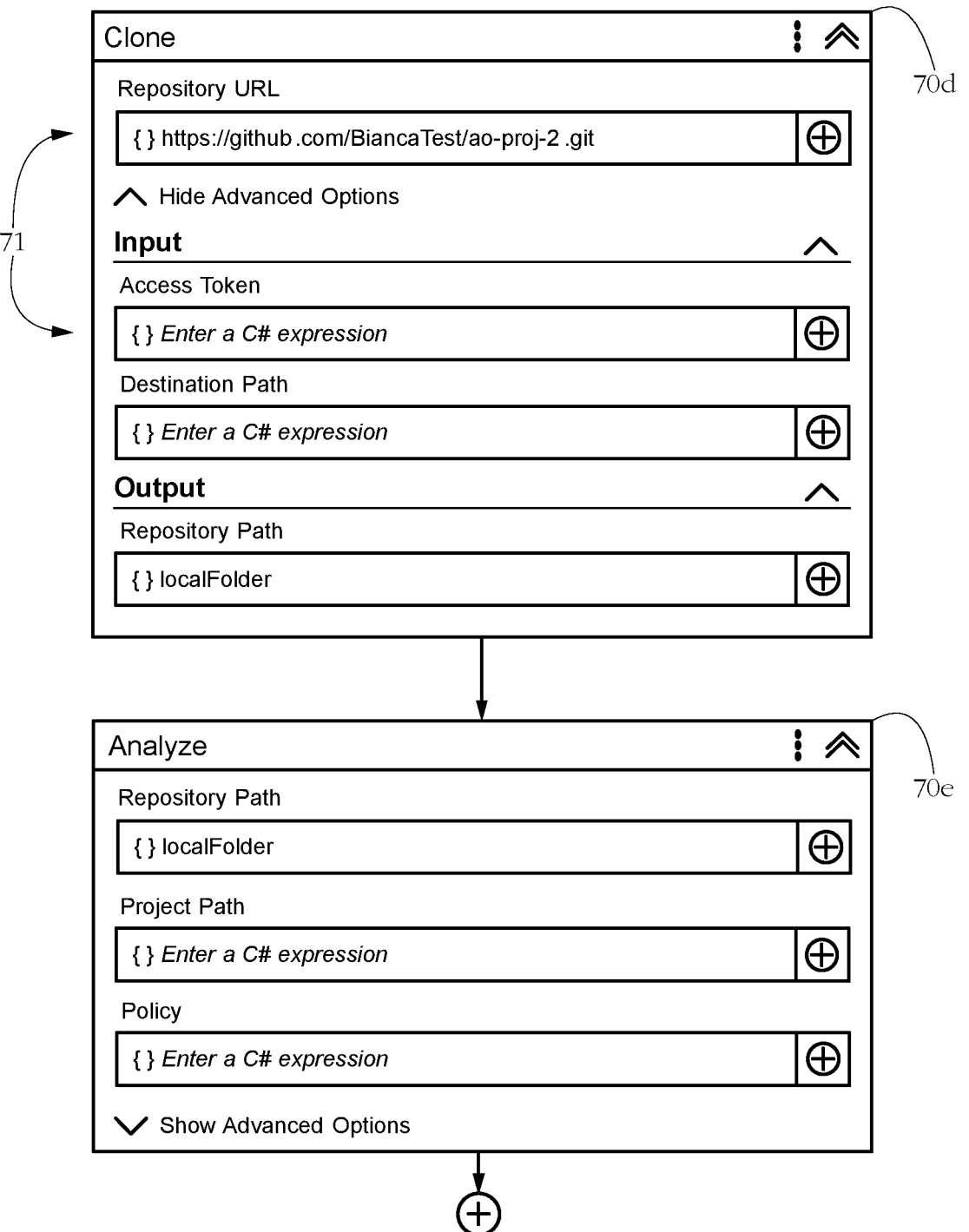
FIG. 7 shows exemplary DevOps activity configuration interfaces according to some embodiments of the present invention.

FIG. 7 illustrates a part of pipeline workflow 58, as displayed by an exemplary RPA design interface 52 according to some embodiments of the present invention. Shown are exemplary activity configuration interfaces associated with DevOps 'clone' and 'analyze' activities, said interfaces displayed within respective activity containers 70*d-e*. Activity configuration interfaces may expose a set of form fields, enabling the developer to set parameters 71 of each respective activity. Such parameters are usually activity-specific, as described in detail above. Some parameters may not be required for a successful execution of the respective activity; some embodiments allow the respective form fields to remain empty. In some embodiments, selected parameters may be set both at design time (i.e., via interface 52) and at runtime (via a DevOps management interface exposed by service 64, as shown in more detail below). One advantage of such flexible configuration is that it effectively decouples the design of the pipeline from the way it is used. This allows, for instance, the design and exploitation of the pipeline to be carried out by distinct operators, possibly from distinct entities or clients. The designer of the pipeline workflow may not know, and often should not know some details such as credentials for accessing a client's production environment (see e.g., AccessToken field in FIG. 7), or where a client stores his/her files. In some embodiments, the respective information is provided to conductor 24 and/or robot 22 by a representative of the client, during a procedure of configuring the pipeline for execution. Also, leaving selected fields empty at design time produces a pipeline template usable for a variety of scenarios, computing environments, and target RPA workflows.

In some embodiments, robot 22 may be configured to dynamically fetch some activity parameter values at runtime, by initiating a data exchange with RPA conductor 24 and/or DevOps management service 64. For instance, when attempting to execute a selected DevOps activity, robot 22 may determine whether all required parameters 71 of the respective activity are currently set, and when no, may request a missing value (e.g. AccessToken in FIG. 7) from service 64.

At the end of the pipeline design process, the developer may save and export the DevOps pipeline workflow, for instance using dedicated controls exposed by a main menu/ribbon 53 of RPA design interface 52 (FIG. 5). In some embodiments, exporting the DevOps workflow comprises building/compiling the workflow into pipeline package 62 and uploading package 62 to RPA conductor 24. In turn, conductor 24 may create an RPA process for pipeline package 62, the RPA process comprising an association between package 62 and a set of computing resources such as robot 22. Registering package 62 with RPA conductor 24 effectively creates a template for carrying out DevOps according to the respective pipeline workflow. Multiple distinct packages 62 may be registered concurrently, thus offering a user a choice between multiple pipeline templates. In some embodiments, RPA conductor 24 is configured to display available pipeline processes/templates in a dedicated section of its user interface (which may be invoked e.g., via a dedicated menu item).

Figure 8:
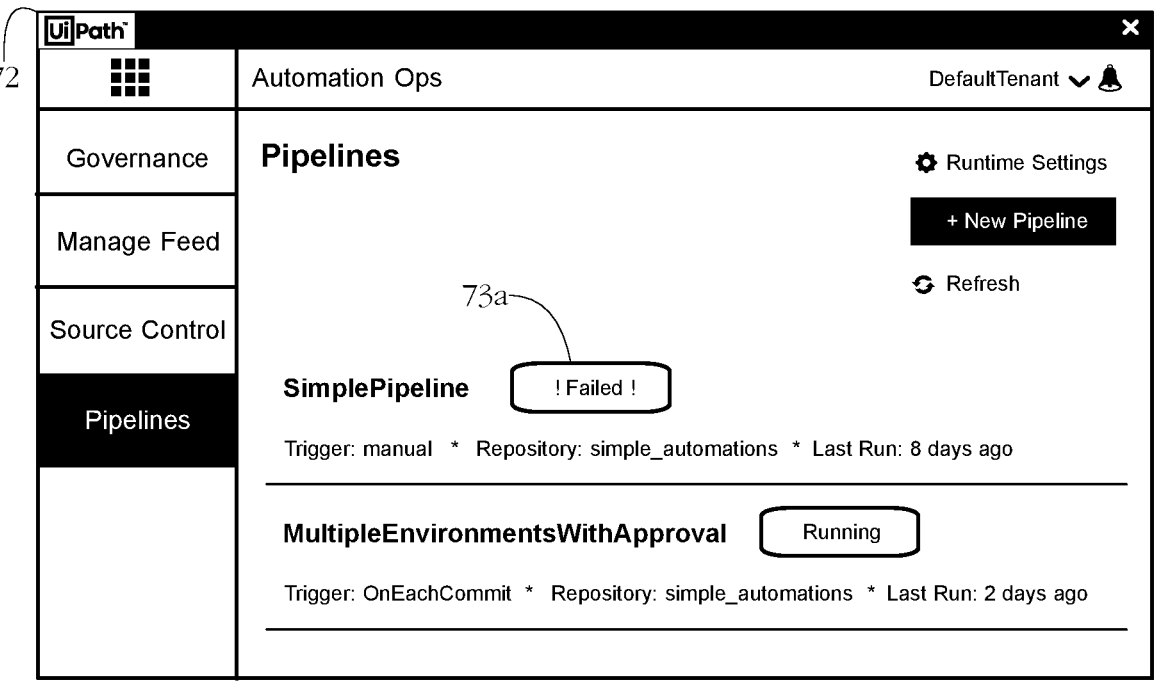
FIG. 8 shows an exemplary view exposed by a DevOps management interface according to some embodiments of the present invention.

In some embodiments, a user may configure and monitor the execution of a pipeline via a DevOps management interface exposed by service 64 (FIG. 4). Exemplary DevOps management interfaces 72 illustrated in FIGS. 8-9 display various information related to a current status of various pipelines. A skilled artisan will understand that all illustrated manners of representing data are exemplary and not meant to be limiting.

Figure 9:
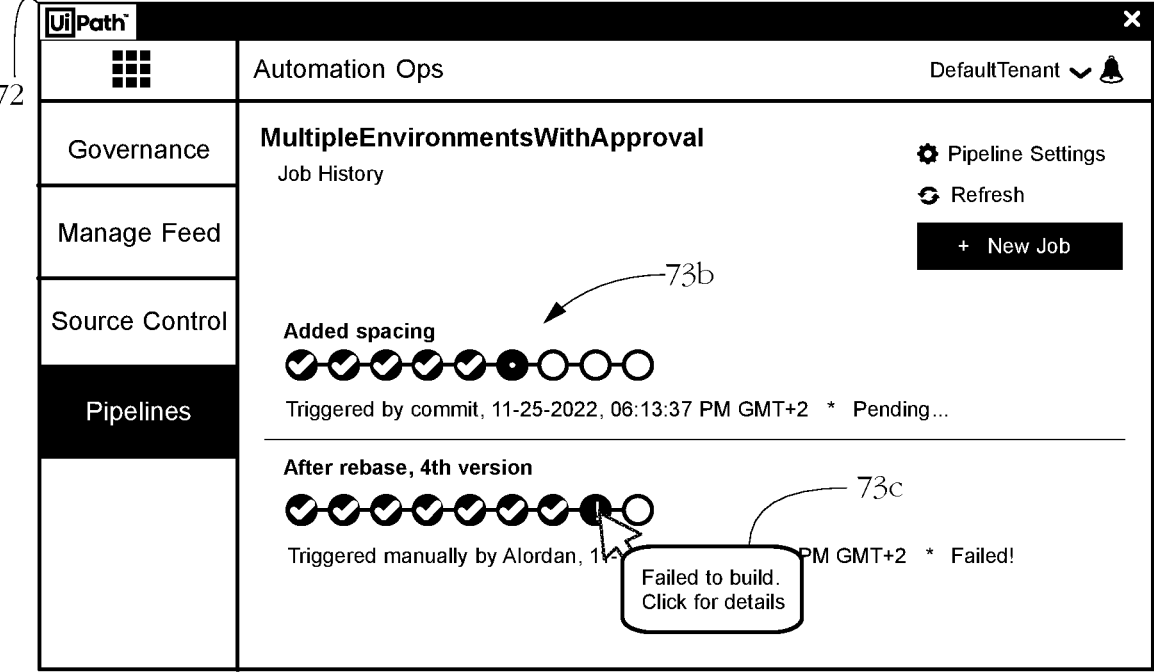
FIG. 9 shows another exemplary view exposed by the DevOps management interface according to some embodiments of the present invention.

For each configured pipeline process, interface 72 may show, for instance, a type of trigger (e.g., manual, repository commit event, etc.), an identifier of a target code repository and/or an identifier of a target RPA workflow, and a timestamp indicative of a time when an instance of the respective pipeline was executed. An exemplary status indicator 73a may show the current status of each pipeline (e.g., completed successfully, still running, suspended, failed, etc.). In some embodiments, activating a UI control (e.g., clicking the pipeline name) may open another view as illustrated in FIG. 9, which provides extra details. The interface illustrated in FIG. 9 displays information on various instances of a selected pipeline process (i.e., distinct executions herein deemed 'jobs'). An exemplary status indicator 73b comprises a progress indicator indicative of a current stage of the execution of the respective job. In the illustrated example, the pipeline process is represented as a string of beads, wherein each bead may represent a distinct DevOps activity of the pipeline workflow. Distinct graphical symbols, shapes and/or colors may be used to indicate activities which completed successfully, activities which are currently under execution, activities which failed to complete, etc. Another exemplary status indicator 73c comprises an overlay/comment window displayed when hovering over a selected activity symbol.

Interface 72 may further expose pipeline configuration controls. For instance, clicking the 'Pipeline settings' button in FIG. 9 may open a UI enabling the user to set parameters such as a type of trigger, among others. A trigger may represent an event that launches a pipeline instance/job into execution. Some jobs may be launched manually, while others may be scheduled to run at certain dates and times, periodically, etc. Another type of trigger may comprise a repository event, such as receiving a new version of the target RPA workflow at code repository 56 (e.g., a GitHub™ commit).

Other exemplary views displayed by DevOps management interface 72 and illustrated in FIGS. 10-11 enable the user to configure a new pipeline for execution. In some embodiments, configuring a new pipeline amounts to selecting a pipeline template from a set of available template, and applying the selected template to a target RPA workflow. In one such example as shown in FIGS. 10-11, interface 72 exposes a set of form fields enabling the user to indicate a target repository and target RPA workflow. Another field enables selection of a pipeline template (herein a template named 'MultipleEnvironmentsWithApproval') from a set of pipeline templates registered with RPA conductor 24, as described above. Yet other input fields are configured to receive runtime values of various pipeline and/or activity parameters 71 (see also FIG. 7). Another view (not shown) displayed by interface 72 may enable the user to configure a trigger for the respective pipeline instance/job.

Figure 12:
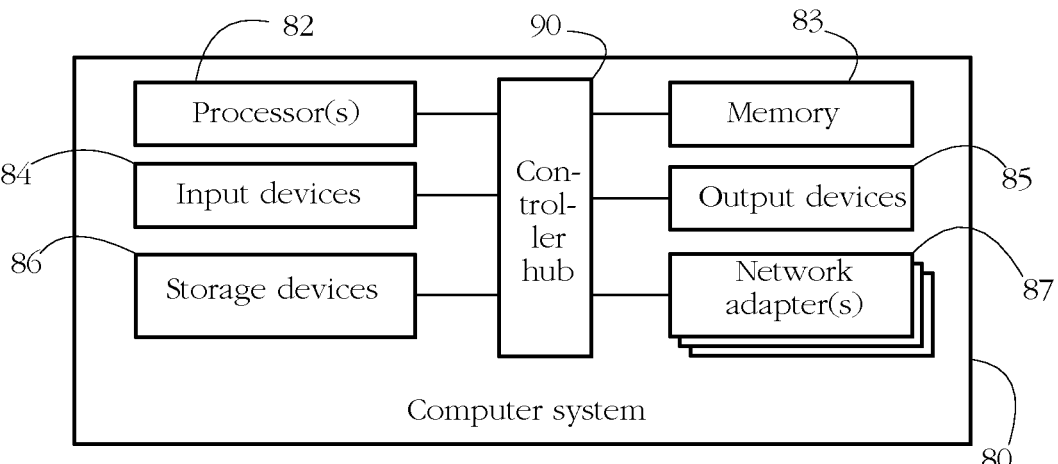
FIG. 12 shows an exemplary hardware configuration of a computer system programmed to execute some of the methods described herein.

FIG. 12 shows an exemplary hardware configuration of a computer system 80 programmed to execute some of the methods described herein. Computer system 80 may represent any of RPA clients 12a-c, as well as RPA server(s) 32 in FIG. 1. The illustrated appliance is a personal computer; other computer systems such as servers, mobile telephones, tablet computers, and wearable computing devices may have slightly different configurations. Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code. Processor(s) 82 may include a central processing unit (CPU) and/or an array of graphics processing units (GPU).

Memory unit 83 may comprise volatile computer-readable media (e.g. dynamic random-access memory—DRAM) storing data and/or instruction encodings accessed or generated by processor(s) 82 in the course of carrying out operations. Input devices 84 may include computer keyboards, mice, trackpads, and microphones, among others, including the respective hardware interfaces and/or adapters allowing a user to introduce data and/or instructions into computer system 80. Output devices 85 may include display devices such as monitors and speakers among others, as well as hardware interfaces/adapters such as graphic cards, enabling the respective computing device to communicate data to a user. In some embodiments, input and output devices 84-85 share a common piece of hardware (e.g., a touch screen). Storage devices 86 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 87 include mechanical, electrical, and signaling circuitry for communicating data over physical links coupled to an electronic communication network (e.g, FIG. 3) and/or to other devices/computer systems. Adapter(s) 87 may be configured to transmit and/or receive data using a variety of communication protocols.

Controller hub 90 generically represents the plurality of system, peripheral, and/or chipset buses, and/or all other circuitry enabling the communication between processor(s) 82 and the rest of the hardware components of computer system 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 83, and/or a southbridge connecting processor 82 to devices 84, 85, 86, and 87.

The exemplary systems and methods described above facilitate RPA operations by enabling automation developers to conduct DevOps (such as testing, building, and deploying automations to clients) without having to resort to specialized DevOps software. Some facilities described herein may thus make RPA development more accessible and attractive to less technically inclined users, or even to users that lack a formal programming background.

In a conventional RPA development scenario, a developer may use an RPA design interface such as UiPath Studio™ to create automation workflows. To speed up the development of complex projects, developer teams often implement a DevOps pipeline to facilitate operations such as versioning, testing, building, and deployment. However, setting up DevOps may require using dedicated software tools such as Jenkins™ and Azure DevOps™, additional expenses, and specialized knowledge expected to exceed that of an average RPA developer.

In contrast to such conventional DevOps, some embodiments of the present invention integrate DevOps activities into existing RPA design software, thus enabling an RPA developer to use a familiar interface and familiar tools to configure a DevOps pipeline. In some embodiments, the DevOps pipeline is defined as an RPA workflow and is executable by conventional RPA robots, like any other workflow. Furthermore, including DevOps activities into the RPA design software enables developers to create complex pipelines which combine DevOps activities such as testing and building a target RPA workflow with any other conventional RPA activities such as interacting with GUIs, spreadsheets, and electronic communication applications, among others. Meanwhile, enhancing the functionality of conventional DevOps pipelines, if at all possible, typically requires substantial programming skills and overhead.

In one example of a pipeline combining DevOps with other types of RPA activities, a pipeline may report the result of testing a target RPA workflow by writing the respective results to a Microsoft Excel™ spreadsheet, and then proceed to build and deploy the target RPA workflow to a client. Some embodiments define such a pipeline by including RPA spreadsheet activities in the pipeline workflow, alongside DevOps activities for testing, building, and deploying the target code.

In another example, a DevOps pipeline may include a step of updating the status of a specific ticket within a project management tool such as Jira™, among others. Such a pipeline may include DevOps activities alongside UI and web activities such as opening a project management interface, inputting credentials for accessing an account, navigating to a 'Tickets' section, selecting the respective ticket and entering an updated status into a form field exposed by the project management interface.

In yet another example, a new set of code compliance rules are received as an attachment to an email message. A DevOps pipeline must include a step wherein the code of the target RPA workflow is statically checked for compliance with the new set of rules. A pipeline workflow created for this scenario according to some embodiments of the present invention may include a DevOps 'analyze' activity alongside RPA activities selected from a 'Communication' activity menu, such as activities for opening an email application, identifying the respective email message, retrieving the attachment containing the code compliance rules, and passing the rules on to a DevOps 'analyze' activity.

It will be clear to one skilled in the art that the above embodiments may be altered in many ways without departing from the scope of the invention. Accordingly, the scope of the invention should be determined by the following claims and their legal equivalents.

What is claimed is:

1. A computer system comprising at least one hardware processor configured to execute a robotic process automation (RPA) design application configured to:
   expose a first activity menu including RPA activities for constructing a target RPA workflow;
   expose a second activity menu including software development operations (DevOps) activities including:
      a code analysis activity for determining whether the target RPA workflow complies with a set of code writing rules,
      a merge activity for merging multiple versions of the target RPA workflow,
      a build activity for compiling the target RPA workflow into an executable package, and
      a deployment activity for deploying the RPA workflow to a target computing environment; and
   in response to a user input selecting an RPA activity from the first activity menu and a DevOps activity from the second activity menu, output a computer-readable specification of a pipeline workflow for carrying out software development operations on the target RPA workflow, the pipeline workflow comprising a sequence of activities including the RPA activity and the DevOps activity.

2. The computer system of claim 1, wherein the RPA activity comprises a robotic activity mimicking an interaction of a human user with a graphical user interface.

3. The computer system of claim 1, wherein the RPA activity comprises a robotic activity mimicking an interaction of a human user with a spreadsheet.

4. The computer system of claim 1, wherein the first and second activity menus are co-displayed within a window exposed by the RPA design application.

5. The computer system of claim 1, wherein user interface (UI) controls for exposing the first and second activity menus are co-displayed within a window exposed by the RPA design application.

6. The computer system of claim 1, wherein the at least one hardware processor is further configured to execute an RPA robot configured to carry out the pipeline workflow.

7. The computer system of claim 1, wherein the RPA design application is further configured to display a diagram of the pipeline workflow comprising a graphical symbol for the RPA activity and another graphical symbol for the DevOps activity.

8. The computer system of claim 1, wherein the at least one hardware processor is further configured to expose a DevOps management interface configured to display a progress of execution of the pipeline workflow.

9. The computer system of claim 1, wherein the at least one hardware processor is further configured to expose a DevOps management interface configured to expose a control for defining a trigger for executing the pipeline workflow.

10. A method comprising employing at least one hardware processor configured to execute an RPA design application configured to:

expose a first activity menu including RPA activities for constructing a target RPA workflow;

expose a second activity menu including DevOps activities including:

a code analysis activity for determining whether the target RPA workflow complies with a set of code writing rules, a merge activity for merging multiple versions of the target RPA workflow, a build activity for compiling the target RPA workflow into an executable package, and a deployment activity for deploying the RPA workflow to a target computing environment; and in response to a user input selecting an RPA activity from the first activity menu and a DevOps activity from the second activity menu, output a computer-readable specification of a pipeline workflow for carrying out software development operations on the target RPA workflow, the pipeline workflow comprising a sequence of activities including the RPA activity and the DevOps activity.

11. The method of claim 10, wherein the RPA activity comprises a robotic activity mimicking an interaction of a human user with a graphical user interface.

12. The method of claim 10, wherein the RPA activity comprises a robotic activity mimicking an interaction of a human user with a spreadsheet.

13. The method of claim 10, wherein the first and second activity menus are co-displayed within a window exposed by the RPA design application.

14. The method of claim 10, wherein UI controls for exposing the first and second activity menus are co-displayed within a window exposed by the RPA design application.

15. The method of claim 10, further comprising employing the at least one hardware processor to execute an RPA robot configured to carry out the pipeline workflow.

16. The method of claim 10, wherein the RPA design application is further configured to display a diagram of the pipeline workflow comprising a graphical symbol for the RPA activity and another graphical symbol for the DevOps activity.

17. The method of claim 10, further comprising employing the at least one hardware processor to expose a DevOps management interface configured to display a progress of execution of the pipeline workflow.

18. The method of claim 10, further comprising employing the at least one hardware processor to expose a DevOps management interface configured to expose a control for defining a trigger for executing the pipeline workflow.

19. A non-transitory computer-readable medium storing instructions which, when executed by at least one hardware processor of a computer system, cause the computer system to form an RPA design application configured to:

expose a first activity menu including RPA activities for constructing a target RPA workflow;

expose a second activity menu including DevOps activities including:

a code analysis activity for determining whether the target RPA workflow complies with a set of code writing rules, a merge activity for merging multiple versions of the target RPA workflow, a build activity for compiling the target RPA workflow into an executable package, and a deployment activity for deploying the RPA workflow to a target computing environment; and in response to a user input selecting an RPA activity from the first activity menu and a DevOps activity from the second activity menu, output a computer-readable specification of a pipeline workflow for carrying out software development operations on the target RPA workflow, the pipeline workflow comprising a sequence of activities including the RPA activity and the DevOps activity.

* * * * *